(12) United States Patent
Kamo et al.

(10) Patent No.: US 7,764,438 B2
(45) Date of Patent: Jul. 27, 2010

(54) ZOOM LENS SYSTEM AND IMAGE PICKUP APPARATUS USING THE SAME

(75) Inventors: Yuji Kamo, Hino (JP); Masahiro Imamura, Hachioji (JP); Tetsuya Yanai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 367 days.

(21) Appl. No.: 11/715,118

(22) Filed: Mar. 6, 2007

(65) Prior Publication Data

US 2007/0217024 A1    Sep. 20, 2007

(30) Foreign Application Priority Data

Mar. 7, 2006   (JP)   ............... 2006-061320

(51) Int. Cl.
   *G02B 15/14*   (2006.01)
(52) U.S. Cl. ...................... 359/687; 359/683
(58) Field of Classification Search ............. 359/687
   See application file for complete search history.

(56) References Cited

U.S. PATENT DOCUMENTS

| | | |
|---|---|---|
| 6,185,048 B1 | 2/2001 | Ishii et al. |
| 6,331,917 B1 | 12/2001 | Ishii et al. |
| 6,535,339 B1 | 3/2003 | Miyauchi |
| 6,714,355 B2 | 3/2004 | Miyauchi |
| 6,744,571 B2 | 6/2004 | Ishii et al. |
| 6,771,432 B2 | 8/2004 | Mihara |
| 6,850,373 B2 | 2/2005 | Mihara et al. |
| 6,937,402 B2 | 8/2005 | Miyauchi |
| 6,975,462 B2 | 12/2005 | Mihara |
| 7,167,320 B2 * | 1/2007 | Ohashi ................ 359/687 |
| 7,221,518 B2 * | 5/2007 | Kim et al. ............ 359/687 |
| 7,319,562 B2 * | 1/2008 | Itoh .................... 359/687 |
| 2002/0057502 A1 | 5/2002 | Ishii et al. |
| 2003/0193722 A1 | 10/2003 | Mihara |
| 2003/0193723 A1 | 10/2003 | Miyauchi |
| 2004/0027685 A1 | 2/2004 | Mihara et al. |
| 2004/0095653 A1 | 5/2004 | Miyauchi |
| 2005/0002115 A1 | 1/2005 | Mihara |

(Continued)

FOREIGN PATENT DOCUMENTS

JP    11119100    4/1999

(Continued)

OTHER PUBLICATIONS

Patent Abstracts of Japan, Publication No. 2004-199000, Jul. 15, 2004.

(Continued)

*Primary Examiner*—Jordan M. Schwartz
(74) *Attorney, Agent, or Firm*—Kenyon & Kenyon LLP

(57) ABSTRACT

A zoom lens system having, in order from an object side, a first lens unit having a positive refractive power; a second lens unit having a negative refractive power; a third lens unit having a positive refractive power; and a fourth lens unit having a positive refractive power, wherein during magnification change from a wide-angle end to a telephoto end, an interval between the first lens unit and the second lens unit, an interval between the second lens unit and the third lens unit and an interval between the third lens unit and the fourth lens unit change.

36 Claims, 14 Drawing Sheets

U.S. PATENT DOCUMENTS

| | | |
|---|---|---|
| 2006/0018032 A1 | 1/2006 | Mihara |
| 2007/0024986 A1* | 2/2007 | Yoshitsugu ................. 359/687 |
| 2009/0141351 A1* | 6/2009 | Bito et al. ................... 359/557 |

FOREIGN PATENT DOCUMENTS

| | | |
|---|---|---|
| JP | 2001133687 | 5/2001 |
| JP | 2003302576 | 10/2003 |
| JP | 2004069808 | 3/2004 |

OTHER PUBLICATIONS

Patent Abstracts of Japan, Publication No. 2003-098433, Apr. 3, 2003.

* cited by examiner

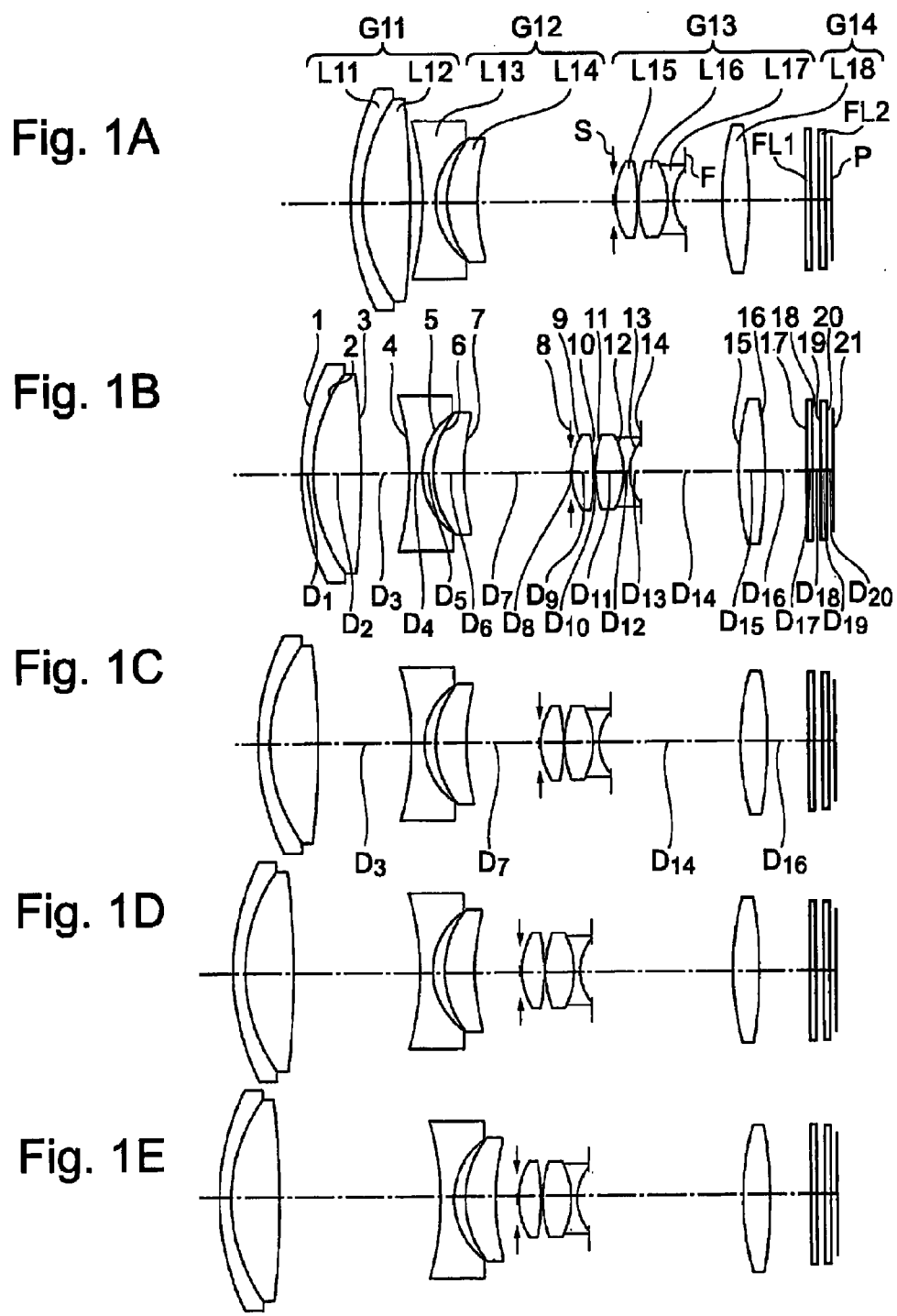

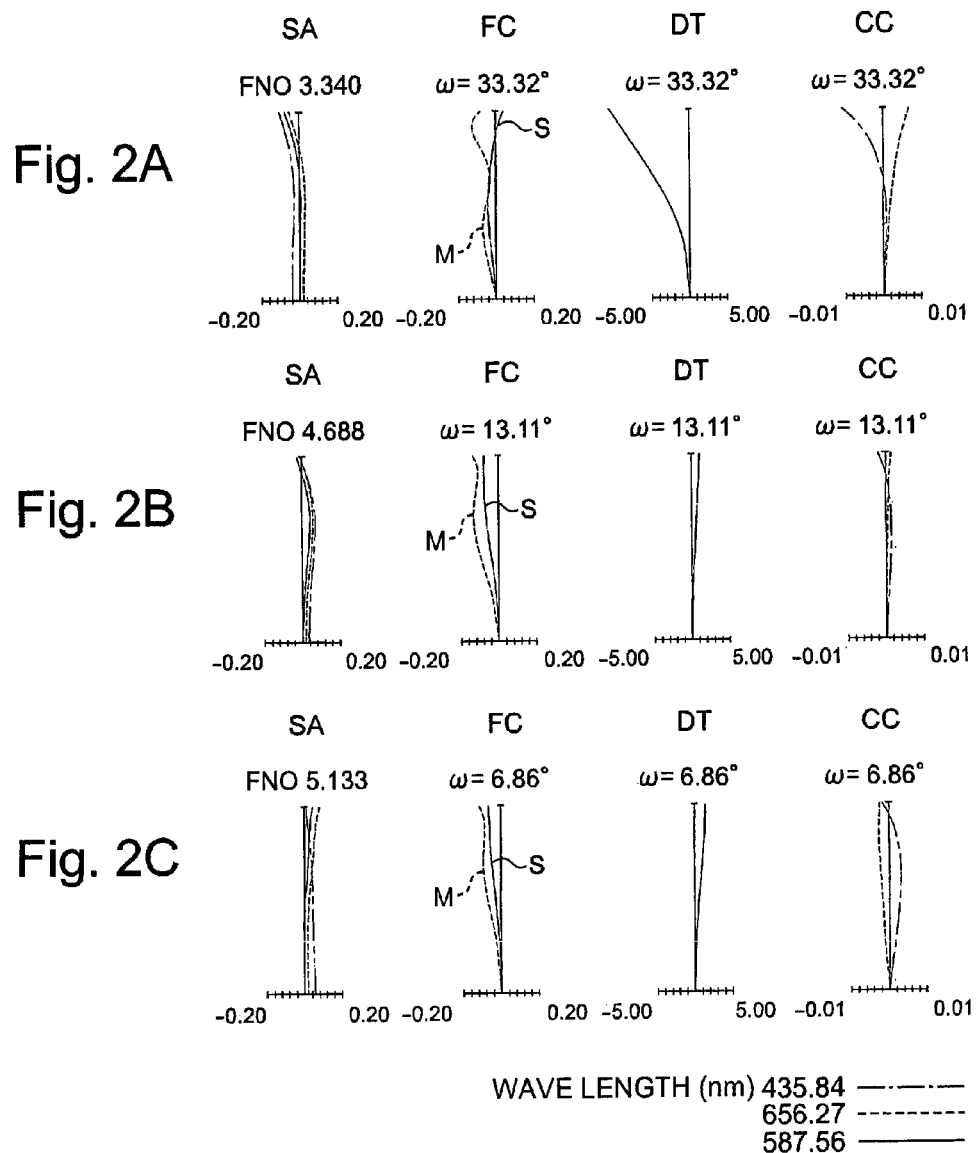

WAVE LENGTH (nm) 435.84 —··—··—
656.27 --------
587.56 ————

WAVE LENGTH (nm) 435.84 —·—·—
656.27 ---------
587.56 ———

WAVE LENGTH (nm) 435.84 —·—·—
656.27 --------
587.56 ———

WAVE LENGTH (nm) 435.84 —·—·—
656.27 ---------
587.56 ———

ZOOM LENS SYSTEM AND IMAGE PICKUP APPARATUS USING THE SAME

CROSS REFERENCE TO RELATED APPLICATION

This application claims benefit under 35 U.S.C. §119 of Japanese Patent Application No. 2006-61,320 filed on Mar. 7, 2006, the contents of which are incorporated herein by reference.

BACKGROUND OF THE INVENTION

1. Field of the Invention

The present invention relates to a zoom lens system and an image pickup apparatus using the same.

2. Description of the Related Art

A digital camera is spreading which is configured to photograph a subject by use of an electronic image pickup element such as a CCD image sensor or a CMOS type image sensor instead of a silver halide film. In recent years, as such a digital camera, people like a small and thin type. A size of the camera in a thickness direction mainly depends on a size of an optical system. Therefore, to achieve miniaturization, a constitution of the optical system becomes important. In recent years, a so-called collapsible lens barrel has become popular in which the optical system is protruded from a camera body during photographing and in which the optical system is stored in the camera body during carrying. Therefore, a lens unit constituted in consideration of a size of the camera when collapsed is remarkably important for a zoom lens system. As a zoom lens system having a small number of lenses, as disclosed in Japanese Patent Application Laid-Open Nos. 2001-133687 and 11-119100, such a type that has, in order from an object side, a first lens unit having a positive power, a second lens unit having a negative power, a third lens unit having a positive power and a fourth lens unit having a positive power is known.

On the other hand, a zoom ratio of a compact type of digital camera is generally about three-fold, but a type having a higher zoom ratio is also demanded.

However, in Example 3 of Japanese Patent Application Laid-Open No. 2001-133687 described above, the number of the lenses is set to eight to miniaturize the camera, but the zoom ratio does not reach three-fold. In Japanese Patent Application Laid-Open No. 11-119100, the number of the lenses is set to seven in Example 1, and set to eight in Examples 3, 4, but similarly the zoom ratio does not reach three-fold.

SUMMARY OF THE INVENTION

According to the present invention, a comparatively small zoom lens system having a high zoom ratio is provided.

A zoom lens system according to the present invention comprises, in order from an object side: a first lens unit having a positive refractive power; a second lens unit having a negative refractive power; a third lens unit having a positive refractive power; and a fourth lens unit having a positive refractive power.

According to one aspect of the present invention, in the zoom lens system, the first lens unit comprises a negative lens element and a positive lens element in order from the object side;

the second lens unit comprises a negative lens element and a positive lens element in order from the object side;

the third lens unit comprises a positive lens element, a positive lens element and a negative lens element in order from the object side;

the fourth lens unit comprises a positive lens element;

the total number of the lens elements of the first to fourth lens units is eight; and during magnification change from a wide-angle end to a telephoto end, an interval between the first lens unit and the second lens unit, an interval between the second lens unit and the third lens unit and an interval between the third lens unit and the fourth lens unit change, and the first lens unit moves.

According to another aspect of the present invention, in the zoom lens system, the first lens unit comprises a negative lens element and a positive lens element in order from the object side;

the second lens unit comprises a negative lens element and a positive lens element in order from the object side;

the third lens unit comprises a positive lens element and a negative lens element in order from the object side;

the fourth lens unit comprises a positive lens element;

the total number of the lens elements of the first to fourth lens units is seven;

during magnification change from a wide-angle end to a telephoto end, an interval between the first lens unit and the second lens unit, an interval between the second lens unit and the third lens unit and an interval between the third lens unit and the fourth lens unit change;

an aperture stop which moves in an optical axis direction during the magnification change is disposed between the second lens unit and the third lens unit; and in the telephoto end than in the wide-angle end, the interval between the first lens unit and the second lens unit increases, the interval between the second lens unit and the third lens unit decreases, the third lens unit is positioned closer to the object side, and the aperture stop is positioned closer to the object side.

In still another aspect of the present invention, in the zoom lens system, during magnification change from a wide-angle end to a telephoto end, an interval between the first lens unit and the second lens unit, an interval between the second lens unit and the third lens unit and an interval between the third lens unit and the fourth lens unit change;

the second lens unit moves; and a movement direction reverses from a moving state toward the object side to a moving state toward an image side between the wide-angle end and an intermediate focal length state with the proviso that the intermediate focal length state is a state in which a focal length of the zoom lens system is a geometrical average value of the focal lengths in the wide-angle end and the telephoto end.

According to a further aspect of the present invention, in the zoom lens system, during magnification change from a wide-angle end to a telephoto end, an interval between the first lens unit and the second lens unit, an interval between the second lens unit and the third lens unit and an interval between the third lens unit and the fourth lens unit change;

the fourth lens unit moves;

a movement direction reverses from a moving state toward an image side to a moving state toward the object side; and the movement direction further reverses from the moving state toward the object side to the moving state toward the image side.

According to a still further aspect of the present invention, in the zoom lens system, the first lens unit comprises at most two lens elements;

the second lens unit comprises a negative lens element and a positive lens element in order from the object side, the total number of the lens elements of the second lens unit is two;

the third lens unit comprises at most three lens elements;

the fourth lens unit comprises one lens element, the total number of the lens elements of the fourth lens unit is one;

during magnification change from a wide-angle end to a telephoto end, an interval between the first lens unit and the second lens unit, an interval between the second lens unit and the third lens unit and an interval between the third lens unit and the fourth lens unit change;

the first lens unit moves;

the interval between the first lens unit and the second lens unit increases;

the interval between the second lens unit and the third lens unit decreases; and the following condition (19) is satisfied:

$$3.0 < f_T/f_W \quad (19),$$

in which $f_T$ is a focal length of the zoom lens system in the telephoto end, and $f_W$ is a focal length of the zoom lens system in the wide-angle end.

The zoom lens system according to the present invention is preferable for use as a photographing lens in an image pickup apparatus such as a video camera or a digital camera. In this case, it is preferable that the image pickup apparatus comprises: the zoom lens system according to the present invention; and an image pickup element which is disposed on the image side of the zoom lens system and which converts an optical image formed by the zoom lens system into an electric signal.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 1A to 1E are sectional views of Example 1 of the present invention along an optical axis, FIG. 1A shows an arrangement of lens units in a wide-angle end, FIGS. 1B, 1C and 1D show arrangements of the lens units in three states between the wide-angle end and a telephoto end, and FIG. 1E shows an arrangement of the lens units in the telephoto end, respectively;

FIGS. 2A to 2C are aberration diagrams showing a spherical aberration (SA), an astigmatism (FC), a distortion (DT) and a chromatic aberration (CC) of magnification of Example 1 when focused on an infinite object, FIG. 2A shows aberrations in the wide-angle end, FIG. 2B shows aberrations in the state shown in FIG. 1C, and FIG. 2C shows aberrations in the telephoto end;

FIG. 3A shows an arrangement of lens units in a wide-angle end, FIGS. 3B, 3C and 3D show arrangements of the lens units in three states between the wide-angle end and a telephoto end, and FIG. 3E shows an arrangement of the lens units in the telephoto end, respectively;

FIG. 4A shows aberrations in the wide-angle end, FIG. 4B shows aberrations in the state shown in FIG. 3C, and FIG. 4C shows aberrations in the telephoto end;

FIG. 5A shows an arrangement of lens units in a wide-angle end, FIGS. 5B, 5C and 5D show arrangements of the lens units in three states between the wide-angle end and a telephoto end, and FIG. 5E shows an arrangement of the lens units in the telephoto end, respectively;

FIG. 6A shows aberrations in the wide-angle end, FIG. 6B shows aberrations in the state shown in FIG. 5C, and FIG. 6C shows aberrations in the telephoto end;

FIG. 7A shows an arrangement of lens units in a wide-angle end, FIGS. 7B, 7C and 7D show arrangements of the lens units in three states between the wide-angle end and a telephoto end, and FIG. 7E shows an arrangement of the lens units in the telephoto end, respectively;

FIG. 8A shows aberrations in the wide-angle end, FIG. 8B shows aberrations in the state shown in FIG. 7C, and FIG. 8C shows aberrations in the telephoto end;

FIG. 9A shows an arrangement of lens units in a wide-angle end, FIGS. 9B, 9C and 9D show arrangements of the lens units in three states between the wide-angle end and a telephoto end, and FIG. 9E shows an arrangement of the lens units in the telephoto end, respectively;

FIG. 10A shows aberrations in the wide-angle end, FIG. 10B shows aberrations in the state shown in FIG. 9G, and FIG. 10C shows aberrations in the telephoto end;

FIG. 11A shows an arrangement of lens units in a wide-angle end, FIGS. 11B, 11C and 11D show arrangements of the lens units in three states between the wide-angle end and a telephoto end, and FIG. 11E shows an arrangement of the lens units in the telephoto end, respectively;

FIG. 12A shows aberrations in the wide-angle end, FIG. 12B shows aberrations in the state shown in FIG. 11C, and FIG. 12C shows aberrations in the telephoto end;

DETAILED DESCRIPTION OF THE PREFERRED EMBODIMENTS

Figure 3A:
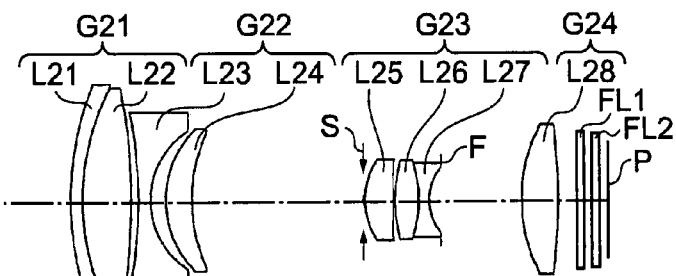
FIGS. 3A to 3E are sectional views of Example 2 of the present invention along an optical axis.

As described above, a zoom lens system according to the present invention includes, in order from an object side, a first lens unit having a positive refractive power, a second lens unit having a negative refractive power, a third lens unit having a positive refractive power and a fourth lens unit having a positive refractive power.

To increase a zoom ratio while maintaining a performance of the zoom lens system, a burden of a magnification change function needs to be appropriately imposed on each lens unit, and an aberration needs to be satisfactorily corrected in the whole magnification change region from a wide-angle end to a telephoto end. Therefore, during the magnification change from the wide-angle end to the telephoto end, an interval between the first lens unit and the second lens unit, an interval between the second lens unit and the third lens unit and an interval between the third lens unit and the fourth lens unit are all changed. In this case, it is preferable that the interval between the first lens unit and the second lens unit increases and that the interval between the second lens unit and the third lens unit decreases.

To change the intervals between the lens units as described above, during the magnification change, a plurality of lens units are moved in an optical axis direction. In this case, it is preferable to move all of the first to fourth lens units. When the lens units are moved, respectively, distribution of the magnification change function to the lens units may be optimized, and this is preferable in setting a high zoom ratio to be compatible with a high performance.

In a case where the first lens unit moves, it is preferable to move the first lens unit so that the unit is positioned closer to the object side in the telephoto end than in the wide-angle end.

According to such a constitution, the total length of the zoom lens system can be reduced, and an entrance pupil can be set to be shallow to reduce a diameter of the first lens unit. On the other hand, since the interval between the first lens unit and the second lens unit can further be increased in the telephoto end, the constitution is advantageous for the high zoom ratio.

In a case where the second lens unit moves, it is preferable that, during the magnification change from the wide-angle end to the telephoto end, the second lens unit once moves toward the object side, then a movement direction reverses, and the second lens unit moves toward an image side. It is preferable that the second lens unit moves so as to be positioned closer to the image side in the telephoto end than in the wide-angle end.

When the interval between the second lens unit and the third lens unit is reduced and the interval between the second lens unit and the first lens unit is increased, a large magnification change function can be exhibited. However, if the second lens unit moves toward the object side for this purpose, the total length of the zoom lens system easily increases in the telephoto end. Therefore, it is preferable that the second lens unit moves toward the image side. However, in this case, the second lens unit is positioned closer to the object side in the wide-angle end than in the telephoto end. Therefore, the total length of the zoom lens system in the wide-angle end tends to be comparatively large. To solve the problem, when the second lens unit is moved along a locus being convex toward the object side from the wide-angle end to the telephoto end, the total length of the lens system in the wide-angle end can also be reduced.

Moreover, it is preferable that, during the magnification change from the wide-angle end to the telephoto end, the movement direction reverses from a moving state toward the object side to a moving state toward the image side between the wide-angle end and an intermediate focal length state. Here, the intermediate focal length state is a state in which a focal length of the zoom lens system is a geometrical average value of the focal lengths in the wide-angle end and the telephoto end.

In the zoom lens system in which during the magnification change from the wide-angle end to the telephoto end, the interval between the first lens unit and the second lens unit, the interval between the second lens unit and the third lens unit and the interval between the third lens unit and the fourth lens unit are all changed, a diameter of the first lens unit is determined depending on a state of an off-axial luminous flux in the vicinity of the wide-angle end. If the interval between the first lens unit and the second lens unit excessively increases in the wide-angle end, the incidence pupil deepens. Therefore, vignetting increases, or the diameter of the first lens unit increases. When the second lens unit is moved as described above, it is possible to suppress an increase of the diameter of the first lens unit. The total length of the zoom lens system in the wide-angle end can be reduced. This constitution is advantageous in reducing the total length of the zoom lens system in the wide-angle end and securing the interval between the first lens unit and the second lens unit.

It is to be noted that in the above constitution, it is preferable that the interval between the first lens unit and the second lens unit increases, the interval between the second lens unit and the third lens unit decreases, and the first lens unit, the second lens unit and the third lens unit are all moved so as to be positioned closer to the object side in the telephoto end than in the wide-angle end.

When the lens units are moved in this manner, absolute values of movement amounts of the first, second and third lens units during the magnification change can come close to one another. Therefore, thicknesses (lengths in the optical axis direction) of cams for moving the lens units while securing the zoom ratio can be brought to be close to one another. This is advantageous in thinning the zoom lens system in a case where the zoom lens system is stored in a body of an image pickup apparatus by use of a collapsible lens barrel.

When the third lens unit moves, it is preferable to move the unit so as to be positioned closer to the object side in the telephoto end than in the wide-angle end.

Moreover, in a case where the fourth lens unit moves, it is preferable that during the magnification change from the wide-angle end to the telephoto end, it is preferable to move the unit so that the movement direction of the fourth lens unit reverses from the moving state toward the image side to the moving state toward the object side, and then the movement direction further reverses from the moving state toward the object side to the moving state toward the image side.

Especially, it is preferable that the fourth lens unit moves so that the movement direction reverses from the moving state toward the image side to the moving state toward the object side between the wide-angle end and the intermediate focal length state, and the movement direction reverses from the moving state toward the object side to the moving state toward the image side between the intermediate focal length state and the telephoto end. The intermediate focal length state is a state in which the focal length of the zoom lens system is a geometrical average value of the focal lengths in the wide-angle end and the telephoto end as described above.

Such a constitution is effective for correction of an astigmatism which fluctuates during the magnification change.

Especially, in a constitution in which during the magnification change from the wide-angle end to the telephoto end, the second lens unit first moves toward the object side and then, the movement direction reverses toward the image side between the wide angle end and the intermediate focal length state, the fluctuations of the astigmatism during the magnification change are easily generated. When the fourth lens unit is moved as described above, it is easy to suppress the fluctuations of the astigmatism in the wide-angle region due to the movement of the second lens unit.

It is preferable that an aperture stop is disposed between the second lens unit and the third lens unit. Moreover, it is preferable that during the magnification change, the aperture stop is moved so as to be positioned closer to the object side in the telephoto end than in the wide-angle end. When the aperture stop is moved in this manner, the aperture stop comes close to the third lens unit easily having a strong power. Therefore, it is easy to correct a chromatic aberration of magnification or a distortion, and this is effective in respect of performance. In addition, it is possible to suppress an increase of a ray height of the third lens unit in the wide-angle end. Even in a case where the third lens unit is constituted of three lenses, the third lens unit can be miniaturized. This is also effective for thinning the zoom lens system when collapsed. This also contributes to the securing of the refractive power of the third lens unit. This also leads to the securing of a movement region of the third lens unit during the magnification change, and the zoom ratio is advantageously increased.

It is preferable that the aperture stop moves integrally with the third lens unit.

When the aperture stop moves integrally with the third lens unit, a change of the ray height at the third lens unit in the magnification change region is reduced, and this is advantageous for miniaturization of the third lens unit.

To miniaturize the zoom lens system, it is necessary to reduce a thickness of the lens system in a depth direction at a time when the lens system is stored in the camera body by use of the collapsible lens barrel. For this purpose, it is preferable to set the total number of the lenses to be as small as possible while maintaining an optical performance. From this viewpoint, it is preferable that each of the first and second lens units is constituted of at most two lenses, the third lens unit is constituted of at most three lenses and the fourth lens unit is constituted of one lens. More specifically, it is preferable that the first lens unit is constituted of two lenses including a negative lens and a positive lens in order from the object side, the second lens unit is constituted of two lenses including a negative lens and a positive lens in order from the object side, the third lens unit is constituted of three lenses including a positive lens, a positive lens and a negative lens in order from the object side, and the fourth lens unit is constituted of one positive lens.

That is, when each of the first and second lens units easily having a large thickness is constituted of the positive lens and the negative lens, the thickness of each lens unit can be reduced while correcting the aberrations in the first and second lens units.

Moreover, in a case where the third lens unit on which a large burden of the magnification change function is easily imposed is constituted of three lenses including the positive lens, the positive lens and the negative lens, the aberrations are satisfactorily corrected. When the third lens unit is constituted in this manner, an axial light flux divergently emitted from the second lens unit and entering the third lens unit can be converged by two positive lenses disposed on the object side in the third lens unit. Accordingly, a diameter of the third lens unit can be reduced. When the negative lens is disposed on the image side in the third lens unit, a principal point of the third lens unit can be disposed closer to an object. This contributes to an increase of the zoom ratio of the zoom lens system. Since the fourth lens unit is constituted of one positive lens, the fourth lens unit can be miniaturized.

It is to be noted that the third lens unit may be constituted of two lenses including a positive lens and a negative lens in order from the object side especially in a case where the miniaturization is regarded as important. Accordingly, the size of the zoom lens system in the thickness direction when collapsed can be reduced as much as one lens, and further miniaturization can be achieved.

That is, since the zoom lens system is constituted in this manner, the aberrations of the lens units can be suppressed while reducing the number of the lenses of each lens unit. This constitution is advantageous for the miniaturization of the zoom lens system when stored, and especially advantageous for the miniaturization of the second lens unit. It is to be noted that when the number of the lenses of the second lens unit is reduced, the fluctuations of the astigmatism are easily generated during the magnification change. However, when the fourth lens unit is moved so as to reverse the movement direction as described above, the fluctuations of the astigmatism can be reduced. In consequence, a compact zoom lens system having a high performance can be obtained.

It is preferable that the positive lens element of the second lens unit is a positive meniscus lens whose convex surface faces the object side in order to effectively correct a coma aberration, the astigmatism and the distortion generated in the negative lens element of the second lens unit.

It is preferable that the negative lens element of the second lens unit is a double concave lens.

Moreover, it is preferable that an object-side surface and an image-side surface of the negative lens element of the second lens unit are aspherical surfaces which are formed into a shape such that the surface has a negative refractive power and the refractive power of a portion on the surface decreases with distance from an optical axis.

When the second lens unit is constituted of two lenses and miniaturized while securing the negative refractive power of the second lens unit, the refractive power of the negative lens element of the second lens unit increases. Therefore, it is preferable that this negative lens is a double concave lens and the negative power is shared by the object-side surface and the image-side surface. Moreover, to correct an off-axial aberration due to a large ray incidence height on this negative lens especially in the wide-angle end, it is preferable that two concave surfaces are aspherical surfaces which are formed into a shape such that the surface has a negative refractive power and the refractive power of a portion on the surface decreases with distance from an optical axis, and an incidence angle of the off-axial light flux is reduced.

It is preferable to secure the power of the third lens unit for the miniaturization of the zoom lens system. However, when the power strengthens, the spherical aberration and the coma aberration generated in the positive lens element of the third lens unit are easily left. Therefore, it is preferable that the negative lens element of the third lens unit is a double concave negative lens for the correction of the aberration generated by the positive lens.

It is preferable that the positive lens element of the first lens unit is a double convex lens in order to secure the positive refractive power of the first lens unit.

Moreover, it is preferable that this positive lens satisfies the following condition (18):

$$0.15 < |r_{L2r}/f_{g1}| < 2.00 \qquad (18),$$

in which $r_{L2r}$ is a paraxial radius of curvature of the image-side surface of the positive lens element of the first lens unit, and $f_{g1}$ is a focal length of the first lens unit.

When $r_{L2r}/f_{g1}$ is not below a lower limit of the condition (18), an excessive increase of the positive power of the image-side surface of the positive lens can be suppressed. Therefore, an axial aberration is easily suppressed.

On the other hand, when an upper limit of the condition is not exceeded, the off-axial aberration easily generated in the concave object-side surface of the negative lens element of the second lens unit in the wide-angle end can easily be corrected by the convex image-side surface of the positive lens.

It is to be noted that it is more preferable to satisfy the following conditions (18-1) or (18-2):

$$0.20 < |r_{L2r}/f_{g1}| < 1.8 \quad (18\text{-}1); \text{ and}$$

$$0.23 < |r_{L2r}/f_{g1}| < 1.5 \quad (18\text{-}2).$$

Moreover, it is preferable that the image-side surface of the positive lens element of the first lens unit is a convex aspherical surface which is formed into a shape such that the surface has a positive refractive power and the refractive power of a portion on the surface decreases with distance from an optical axis.

The ray height of the off-axial light flux corresponding to the maximum image height changes at a time when the light flux enters the first lens unit during the magnification change. When the surface of the first lens unit close to the second lens unit is an aspherical surface as described above, the fluctuations of the astigmatism easily generated in the second lens unit are easily suppressed.

It is preferable that the above zoom lens system satisfies the following condition (1):

$$0.6 < f_T/f_{g1} < 2.5 \quad (1),$$

in which $f_T$ is a focal length of the zoom lens system in the telephoto end, and $f_{g1}$ is a focal length of the first lens unit.

When $f_T/f_{g1}$ is not above the upper limit value of the condition (1), an excessive increase of the power of the first lens unit can be suppressed. This constitution is especially advantageous for the correction of the spherical aberration and the coma aberration in the telephoto end.

On the other hand, when $f_T/f_{g1}$ is not below a lower limit value of the condition (1), the power of the first lens unit can be secured. This is advantageous for reduction of the total length of the zoom lens system in the telephoto end.

It is to be noted that it is more preferable to satisfy the following condition (1-1) or (1-2):

$$0.7 < f_T/f_{g1} < 2.0 \quad (1\text{-}1); \text{ and}$$

$$0.9 < f_T/f_{g1} < 1.3 \quad (1\text{-}2).$$

Moreover, it is preferable that the above zoom lens system satisfies the following condition (2):

$$-10 < f_T/f_{g2} < -2.5 \quad (2),$$

in which $f_T$ is a focal length of the zoom lens system in the telephoto end, and $f_{g2}$ is a focal length of the second lens unit.

When $f_T/f_{g2}$ is not above the upper limit value of the condition (2), the power of the second lens unit can be secured. This is advantageous for reduction of the total length of the zoom lens system.

On the other hand, when $f_T/f_{g2}$ is not below a lower limit value of the condition (2), an excessive increase of the power of the second lens unit can be suppressed. This is advantageous for the correction of the distortion and the astigmatism in the wide-angle end and the spherical aberration and the coma aberration in the telephoto end.

It is to be noted that it is more preferable to satisfy the following condition (2-1) or (2-2):

$$-7 < f_T/f_{g2} < -3 \quad (2\text{-}1); \text{ and}$$

$$-5 < f_T/f_{g2} < -4 \quad (2\text{-}2).$$

Moreover, it is preferable that the above zoom lens system satisfies the following condition (3):

$$2 < f_T/f_{g3} < 7 \quad (3),$$

in which $f_T$ is a focal length of the zoom lens system in the telephoto end, and $f_{g3}$ is a focal length of the third lens unit.

When $f_T/f_{g3}$ is not above an upper limit value of the condition (3), an excessive increase of the power of the third lens unit can be suppressed. This is advantageous for the corrections of the spherical aberration and the coma aberration especially in the telephoto end.

On the other hand, when $f_T/f_{g3}$ is not below a lower limit value of the condition (3), the power of the third lens unit can be secured, the movement amount of the third lens unit can be reduced, and the total length of the zoom lens system can advantageously be reduced.

It is to be noted that it is more preferable to satisfy the following condition (3-1) or (3-2):

$$2.5 < f_T/f_{g3} < 5 \quad (3\text{-}1); \text{ and}$$

$$3 < f_T/f_{g3} < 4 \quad (3\text{-}2).$$

Moreover, it is preferable that the above zoom lens system satisfies the following condition (4):

$$1.35 < f_T/f_{g4} < 5 \quad (4),$$

in which $f_T$ is a focal length of the zoom lens system in the telephoto end, and $f_{g4}$ is a focal length of the fourth lens unit.

When $f_T/f_{g4}$ is not above an upper limit value of the condition (4), an excessive increase of the power of the fourth lens unit can be suppressed. This is advantageous in avoiding overcorrection of the astigmatism and the distortion in the whole magnification change region.

On the other hand, when $f_T/f_{g4}$ is not below a lower limit value of the condition (4), the power of the fourth lens unit is secured, and the position of an exit pupil can be appropriately adjusted. This is advantageous in avoiding undercorrection of the astigmatism and the distortion in the whole magnification change region.

It is to be noted that it is more preferable to satisfy the following condition (4-1) or (4-2):

$$1.5 < f_T/f_{g4} < 3 \quad (4\text{-}1); \text{ and}$$

$$1.7 < f_T/f_{g4} < 2 \quad (4\text{-}2).$$

Moreover, it is preferable that the above zoom lens system satisfies the following condition (5):

$$0.3 < f_{g1}/f_{Tg234} < 2.5 \quad (5),$$

in which $f_{g1}$ is a focal length of the first lens unit, and $f_{Tg234}$ is a focal length of a composite lens unit constituted of the second lens unit to the fourth lens unit in the telephoto end.

When $f_{g1}/f_{Tg234}$ is not above an upper limit of the condition (5), the power of the first lens unit can be secured with respect to a subunit constituted of the second lens unit to the fourth lens unit. This is advantageous for the reduction of the total length of the zoom lens system.

On the other hand, when $f_{g1}/f_{Tg234}$ is not below a lower limit of the condition (5), it is possible to suppress an excessive increase of the power of the first lens unit with respect to the composite lens unit constituted of the second lens unit to the fourth lens unit. This is advantageous in correcting the aberrations, especially the spherical aberration and the coma aberration generated in the first lens unit.

It is to be noted that it is more preferable to satisfy the following condition (5-1) or (5-2):

$$0.9 < f_{g1}/f_{Tg234} < 2.0 \quad (5\text{-}1); \text{ and}$$

$$1.5 < f_{g1}/f_{Tg234} < 1.8 \quad (5\text{-}2).$$

Moreover, it is preferable that the above zoom lens system satisfies the following condition (6):

$$-0.7 < f_{g2}/f_{Tg34} < -0.2 \quad (6),$$

in which $f_{g2}$ is a focal length of the second lens unit, and $f_{Tg34}$ is a focal length of a composite lens unit constituted of the third lens unit and the fourth lens unit in the telephoto end.

When $f_{g2}/f_{Tg34}$ is not above an upper limit of the condition (6), it is possible to suppress an excessive increase of the power of the second lens unit with respect to the composite lens unit constituted of the third lens unit and the fourth lens unit. This is advantageous in suppressing the aberration fluctuations of the coma aberration and the astigmatism in the whole magnification change region.

On the other hand, when $f_{g2}/f_{Tg34}$ is not below a lower limit of the condition (6), it is possible to secure the power of the second lens unit with respect to the composite lens unit constituted of the third lens unit and the fourth lens unit. This is advantageous in reducing the total length of the zoom lens system and reducing the movement amount of the second lens unit.

It is to be noted that it is more preferable to satisfy the following condition (6-1) or (6-2):

$$-0.6 < f_{g2}/f_{Tg34} < -0.3 \quad (6\text{-}1); \text{ and}$$

$$-0.5 < f_{g2}/f_{Tg34} < -0.4 \quad (6\text{-}2).$$

Moreover, it is preferable that the above zoom lens system satisfies the following condition (7) in a case where the third lens unit is constituted of three lenses:

$$-0.45 < f_{g3}/f_{Tg12} < -0.1 \quad (7),$$

in which $f_{g3}$ is a focal length of the third lens unit, and $f_{Tg12}$ is a focal length of a composite lens unit constituted of the first lens unit and the second lens unit in the telephoto end.

When $f_{g3}/f_{Tg12}$ is not above an upper limit of the condition (7), it is possible to suppress an excessive increase of the power of the third lens unit with respect to the composite lens unit constituted of the first lens unit and the second lens unit. This is advantageous in reducing the fluctuations of the spherical aberration, the coma aberration and the astigmatism in the whole magnification change region.

On the other hand, when $f_{g3}/f_{Tg12}$ is not below a lower limit of the condition (7), it is possible to secure the power of the third lens unit with respect to the composite lens unit constituted of the first lens unit and the second lens unit. This is advantageous in reducing the total length of the zoom lens system and reducing the movement amount of the third lens unit.

It is to be noted that it is more preferable to satisfy the forming condition (7-1) or (7-2):

$$-0.4 < f_{g3}/f_{Tg12} < -0.2 \quad (7\text{-}1); \text{ and}$$

$$-0.37 < f_{g3}/f_{Tg12} < -0.25 \quad (7\text{-}2).$$

Moreover, it is preferable that the above zoom lens system satisfies the following condition (8) in a case where the third lens unit is constituted of two lenses:

$$-0.55 < f_{g3}/f_{Tg12} < -0.15 \quad (8),$$

in which $f_{g3}$ is a focal length of the third lens unit, and $f_{Tg12}$ is a focal length of a composite lens unit constituted of the first lens unit and the second lens unit in the telephoto end.

Aims of an upper limit and a lower limit of this condition are similar to those of the condition (7).

It is to be noted that it is more preferable to satisfy the following condition (8-1):

$$-0.52 < f_{g3}/f_{Tg12} < -0.25 \quad (8\text{-}1).$$

Furthermore, in the above zoom lens system, it is preferable to satisfy the following condition (9) in a case where the first lens unit is moved so as to be positioned closer to the object side in the telephoto end than in the wide-angle end:

$$0.2 < |D_{g1}/D| < 1.5 \quad (9),$$

in which $D_{g1}$ is a displacement amount of the first lens unit from the wide-angle end to the telephoto end, which is represented by a positive sign when the first lens unit is positioned closer to the image side in the telephoto end than in the wide-angle end, and D is a sum of thicknesses (distances from an incidence surface to an emission surface) of the first lens unit, the second lens unit, the third lens unit and the fourth lens unit along the optical axis.

When $|D_{g1}/D|$ is not above an upper limit of the condition (9), it is possible to suppress the movement amount of the first lens unit. This is advantageous for the reduction of the total length of the zoom lens system in the telephoto end. An increase of the thickness (a length in the optical axis direction) of a cam member for moving the lens unit is advantageously suppressed, and this contributes to thinning of the lens barrel.

On the other hand, when $|D_{g1}/D|$ is not below the lower limit of the condition (9), it is possible to maintain an effect of the aberration correction produced by moving the first lens unit. This is advantageous for the corrections of especially the coma aberration and the astigmatism in the whole magnification change region.

It is to be noted that it is more preferable to satisfy the following condition (9-1) or (9-2):

$$0.35 < |D_{g1}/D| < 1.0 \quad (9\text{-}1); \text{ and}$$

$$0.5 < |D_{g1}/D| < 0.8 \quad (9\text{-}2).$$

Moreover, it is preferable to satisfy the following condition (10):

$$-0.4 < D_{g2}/D < 0.4 \quad (10),$$

in which $D_{g2}$ is a displacement amount of the second lens unit from the wide-angle end to the telephoto end, which is represented by a positive sign when the second lens unit is positioned closer to the image side in the telephoto end than in the wide-angle end, and D is a sum of thicknesses (a distance from the incidence surface to the emission surface) of the first lens unit, the second lens unit, the third lens unit and the fourth lens unit along the optical axis.

When $D_{g2}/D$ is not above an upper limit of the condition (10), it is possible to secure a space for movement of the third lens unit. This is advantageous in securing the zoom ratio.

On the other hand, when $D_{g2}/D$ is not below a lower limit of the condition (10), it is possible to suppress a change of the total length of the zoom lens system during the magnification change. Moreover, it is possible to secure a change of the interval between the first lens unit and the second lens unit.

It is to be noted that when the following condition (10-1) or (10-2) is satisfied, the burden of the magnification change function is preferably distributed to the lens units.

$$-0.25 < D_{g2}/D < 0.25 \quad (10\text{-}1); \text{ and}$$

$$-0.15 < D_{g2}/D < 0.15 \quad (10\text{-}2).$$

In this case, it is preferable to further satisfy the following condition (11) in addition to the conditions (10), (10-1) or (10-2):

$$0.01 < |D_{g2}|/D \quad (11).$$

When $|D_{g2}|/D$ is not below a lower limit of the condition (11), it is possible to adjust an aberration correction effect due to a difference of the position of the second lens unit between the wide-angle end and the telephoto end. This is advantageous in adjusting especially the coma aberration and the astigmatism in the whole magnification change region.

It is to be noted that it is more preferable to satisfy the condition (11-1) or (11-2):

$$0.02 < |D_{g2}|/D \quad (11\text{-}1); \text{ and}$$

$$0.03 < |D_{g2}|/D \quad (11\text{-}2).$$

Moreover, in the above zoom lens system, in a case where during the magnification change from the wide-angle end to the telephoto end, the second lens unit moves toward the object side, then the movement direction reverses so that the second lens unit moves toward the image side and the second lens unit moves so as to be positioned closer to the image side in the telephoto end than in the wide-angle end, it is preferable to satisfy the following condition (12):

$$0.01 < D_{g2}/D < 0.25 \quad (12).$$

When $D_{g2}/D$ is not above an upper limit of the condition (12), it is possible to suppress an excessively movement of the second lens unit toward the object side in the wide-angle end. This is advantageous in reducing the total length of the system in the wide-angle end. When the movement amount of the second lens unit is suppressed, the aberration fluctuations are advantageously suppressed.

On the other hand, when the condition is not below a lower limit, it is possible to suppress excessive movement of the second lens unit toward the image side in the wide-angle end. This is advantageous in reducing a lens diameter of the first lens unit. Furthermore, an incidence angle of an off-axial ray upon an image surface can be reduced, and deterioration of image quality due to shading can easily be suppressed. It is also possible to reduce the total length of the zoom lens system in the telephoto end.

It is to be noted that it is more preferable to satisfy the following condition (12-1) or (12-2):

$$0.02 < D_{g2}/D < 0.2 \quad (12\text{-}1); \text{ and}$$

$$0.03 < D_{g2}/D < 0.15 \quad (12\text{-}2).$$

Moreover, it is preferable that the above zoom lens system satisfies the following condition (13), $$0.4 < |D_{g3}/D| < 1.0 \quad (13),$$

in which $D_{g3}$ is a displacement amount of the third lens unit from the wide-angle end to the telephoto end, which is represented by a positive sign when the third lens unit is positioned closer to the image side in the telephoto end than in the wide-angle end, and D is a sum of thicknesses (the distance from the incidence surface to the emission surface) of the first lens unit, the second lens unit, the third lens unit and the fourth lens unit along the optical axis.

When $|D_{g3}/D|$ is not above an upper limit of the condition (13), it is possible to suppress an excessive increase of the movement amount of the third lens unit. This is advantageous in reducing the total length of the zoom lens system and reducing the thickness (the length in the optical axis direction) of the cam member to thin the lens barrel.

On the other hand, when $|D_{g3}/D|$ is not below a lower limit of the condition (13), it is possible to maintain an aberration correcting effect of the third lens unit. This is useful in maintaining a performance of another lens unit in the whole magnification change region, and this is advantageous especially in correcting the coma aberration and the astigmatism in the whole magnification change region.

It is to be noted that it is more preferable to satisfy the following condition (13-1) or (13-2):

$$0.45 < |D_{g3}/D| < 0.8 \quad (13\text{-}1); \text{ and}$$

$$0.4 < |D_{g3}/D| < 0.6 \quad (13\text{-}2).$$

Moreover, it is preferable that the above zoom lens system satisfies the following condition (14):

$$-0.8 < (r_{L2f} + r_{L2r})/(r_{L2f} - r_{L2r}) < 0.0 \quad (14),$$

in which $r_{L2f}$ is a paraxial radius of curvature of the object-side surface of the positive lens element of the first lens unit, and $r_{L2r}$ is a paraxial radius of curvature of the image-side surface of the positive lens element of the first lens unit.

When $(r_{L2f} + r_{L2r})/(r_{L2f} - r_{L2r})$ is not above an upper limit of the condition (14), the coma aberration and the astigmatism generated in the first lens unit are advantageously corrected.

On the other hand, when $(r_{L2f} + r_{L2r})/(r_{L2f} - r_{L2r})$ is not below a lower limit of the condition (14), the power of the first lens unit is easily maintained while reducing a curvature of the object-side surface of the positive lens. This is advantageous in reducing the movement amount of the first lens unit and reducing the total length of the zoom lens system.

It is to be noted that it is more preferable to satisfy the following condition (14-1) or (14-2):

$$-0.7 < (r_{L2f} + r_{L2r})/(r_{L2f} - r_{L2r}) < -0.1 \quad (14\text{-}1); \text{ and}$$

$$-0.7 < (r_{L2f} + r_{L2r})/(r_{L2f} - r_{L2r}) < -0.5 \quad (14\text{-}2).$$

Moreover, it is preferable that the above zoom lens system satisfies the following condition (15):

$$0.1 < (r_{L3f} + r_{L3r})/(r_{L3f} - r_{L3r}) < 0.75 \quad (15),$$

in which $r_{L3f}$ is a paraxial radius of curvature of the object-side surface of the negative lens element of the second lens unit, and $r_{L3r}$ is a paraxial radius of curvature of the image-side surface of the negative lens element of the second lens unit.

When $(r_{L3f} + r_{L3r})/(r_{L3f} - r_{L3r})$ is not above an upper limit of the condition (15), the power of the second lens unit is easily maintained. Therefore, excessive increases of the movement amounts of the lens units disposed before and after the second lens unit are prevented, and the total length of the zoom lens system is advantageously reduced.

On the other hand, when $(r_{L3f} + r_{L3r})/(r_{L3f} - r_{L3r})$ is not below the lower limit of the condition (15), the coma aberration and the astigmatism generated in the second lens unit are advantageously corrected.

It is to be noted that it is more preferable to satisfy the following condition (15-1) or (15-2):

$$0.2 < (r_{L3f} + r_{L3r})/(r_{L3f} - r_{L3r}) < 0.7 \quad (15\text{-}1); \text{ and}$$

$$0.35 < (r_{L3f} + r_{L3r})/(r_{L3f} - r_{L3r}) < 0.55 \quad (15\text{-}2).$$

Moreover, it is preferable that the above zoom lens system satisfies the following condition (16):

$$-10 < (r_{L4f} + r_{L4r})/(r_{L4f} - r_{L4r}) < -2 \quad (16),$$

in which $r_{L4f}$ is a paraxial radius of curvature of the object-side surface of the positive lens element of the second lens unit, and $r_{L4r}$ is a paraxial radius of curvature of the image-side surface of the positive lens element of the second lens unit.

When $(r_{L4f} + r_{L4r})/(r_{L4f} - r_{L4r})$ is not above an upper limit of the condition (16), an excessive increase of a radius of curvature of an emission surface of the positive lens can be suppressed. This is advantageous in avoiding undercorrection of the coma aberration and the astigmatism.

On the other hand, when $(r_{L4f} + r_{L4r})/(r_{L4f} - r_{L4r})$ is not below the lower limit of the condition (16), the radii of curvature of the opposite surfaces of the positive lens can be prevented from being too close to each other. Therefore, the power of the positive lens is easily secured, and various aberrations of the second lens unit are advantageously corrected.

It is to be noted that it is more preferable to satisfy the following condition (16-1) or (16-2):

$$-5 < (r_{L4f} + r_{L4r})/(r_{L4f} - r_{L4r}) < -2.3 \quad (16\text{-}1); \text{ and}$$

$$-3 < (r_{L4f} + r_{L4r})/(r_{L4f} - r_{L4r}) < -2.4 \quad (16\text{-}2).$$

Furthermore, in the above zoom lens system, it is preferable that the third lens unit includes a double concave negative lens and the following condition (17) is satisfied:

$$-0.8 < (r_{L7f} + r_{L7r})/(r_{L7f} - r_{L7r}) < 0.8 \quad (17),$$

in which $r_{L7f}$ is a paraxial radius of curvature of the object-side surface of the double concave negative lens and $r_{L7r}$ is a paraxial radius of curvature of the image-side surface of the double concave negative lens.

When $(r_{L7f} + r_{L7r})/(r_{L7f} - r_{L7r})$ is not above an upper limit of the condition (17), the curvature of the object-side surface of the double concave negative lens is secured, and the aberration is easily corrected. Alternatively, since the curvature of the image-side surface can be prevented from being excessively large, generation of a higher-order aberration due to overcorrection of the aberration is advantageously inhibited.

On the other hand, when $(r_{L7f} + r_{L7r})/(r_{L7f} - r_{L7r})$ is not below a lower limit of the condition (17), an excessively large curvature of the object-side surface of the double concave negative lens can be suppressed. This is advantageous in inhibiting the generation of the higher-order aberration due to the overcorrection of the aberration.

It is to be noted that it is more preferable to satisfy the following condition (17-1) or (17-2):

$$-0.5 < (r_{L7f} + r_{L7r})/(r_{L7f} - r_{L7r}) < 0.6 \quad (17\text{-}1); \text{ and}$$

$$0 < (r_{L7f} + r_{L7r})/(r_{L7f} - r_{L7r}) < 0.4 \quad (17\text{-}2).$$

Furthermore, it is preferable that the above zoom lens system satisfies the following condition (19):

$$3.0 < f_T/f_W \quad (19),$$

in which $f_T$ is a focal length of the zoom lens system in the telephoto end, and $f_W$ is a focal length of the zoom lens system in the wide-angle end.

When $f_T/f_W$ is not below a lower limit of the condition (19), it is possible to obtain a zoom lens system having a high zoom ratio.

It is to be noted that it is more preferable to satisfy the following condition (19-1) or (19-2):

$$4.0 < f_T/f_W \quad (19\text{-}1); \text{ and}$$

$$4.5 < f_T/f_W \quad (19\text{-}2).$$

The zoom lens system according to the present invention is advantageous in bringing an off-axial chief ray emitted from the lens system into almost parallel state with respect to the optical axis. Therefore, the zoom lens system according to the present invention is especially preferable for use in combination with an image pickup element whose performance largely depends on the incidence angle of the ray on the light receiving surface.

Next, numerical examples of the zoom lens system according to the present invention will be described.

EXAMPLE 1

FIGS. 1A to 1E are sectional views of Example 1 along an optical axis, FIG. 1A shows an arrangement of lens units in a wide-angle end, FIGS. 1B, 1C and 1D show arrangements of the lens units in three states between the wide-angle end and a telephoto end, and FIG. 1E shows an arrangement of the lens units in the telephoto end, respectively. A focal length increases in order of FIGS. 1A, 1B, 1C, 1D and 1E.

FIGS. 2A to 2C are aberration diagrams showing a spherical aberration (SA), an astigmatism (FC), a distortion (DT) and a chromatic aberration (CC) of magnification of Example 1 when focused on an infinite object, FIG. 2A shows aberrations in the wide-angle end, FIG. 2B shows aberrations in the state shown in FIG. 1C, and FIG. 2C shows aberrations in the telephoto end.

As shown, a zoom lens system of Example 1 includes, in order from an object side, a positive first lens unit G11, a negative second lens unit G12, an aperture stop S, a positive third lens unit G13, and a positive fourth lens unit G14. A flare stop F is disposed on an image side of the third lens unit G13, and parallel plane plates FL1 and FL2. The image surface is indicated as P. When the zoom lens system is used with a CCD image sensor, the light receiving surface of the CCD image sensor is placed on the image surface P.

The first lens unit G11 is constituted of, in order from the object side, a negative meniscus lens L11 whose convex surface faces the object side and a double convex positive lens L12 whose image-side surface is an aspherical surface, and these two lenses are cemented. The second lens unit G12 is constituted of, in order from the object side, a double concave negative lens L13 whose opposite surfaces are aspherical surfaces, and a positive meniscus lens L14 whose convex surface faces the object side. The third lens unit G13 is constituted of, in order from the object side, a double convex positive lens L15 whose opposite surfaces are aspherical surfaces, a double convex positive lens L16 and a double concave negative lens L17, and two lenses L16 and L17 are cemented. The fourth lens unit G14 is constituted of a double convex positive lens L18 whose object-side surface is an aspherical surface. The parallel plane plate FL1 is a low pass filter on at least on of the surfaces of which is coated with infrared cut coating, and FL2 is a cover glass of the CCD image sensor.

In the zoom lens system of Example 1, during magnification change from the wide-angle end to the telephoto end, the first lens unit G11 moves toward the object side. The second lens unit G12 once moves toward the object side. Then, the movement direction reverses before reaching an intermediate focal length state (in the wide-angle end rather than the intermediate focal length state) and the unit moves toward the image side. The third lens unit G13 moves toward the object side. The fourth lens unit G14 once moves toward the image side. Subsequently, the movement direction reverses before reaching the intermediate focal length state (in the wide-angle end rather than the intermediate focal length state) and the unit moves toward the object side. Furthermore, after the intermediate focal length state (between the intermediate focal length state and the telephoto end), the movement direction again reverses, and the fourth lens unit moves toward the image side. It is to be noted that the intermediate focal length state is a state in which the focal length is a geometrical average value of the focal lengths of the zoom lens system in the wide-angle end and the telephoto end.

Moreover, in Example 1, an image height is 3.84 mm, a focal length is 6.52 to 10.34 to 16.32 to 22.52 to 31.49 mm, and Fno is 3.34 to 4.13 to 4.69 to 4.94 to 5.13.

Next, numerical data of Example 1 will be described.

It is to be noted that in the numerical data, R is a radius of curvature of each lens surface; D is a thickness or an interval of each lens; Nd, Vd is a refractive index and the Abbe number of each lens for the d-line; and D1, D3, D7, D15 and D17 are variable intervals. Moreover, fL is a focal length of the zoom lens system; Fno is the F number; and $2\omega$ is an angle of field ($\omega$ is a half angle of field. The symbol "ASP" affixed to the value of R indicates that the surface is an aspherical surface. A unit of each of R, D and fL is mm. It is to be noted that a shape of the aspherical surface is represented by the following equation in a coordinate system in which an intersection between the aspherical surface and the optical axis is an origin, the optical axis is a z-axis and a y-axis extends in an arbitrary direction crossing the optical axis at right angles and passing through the origin.

$$z = (y^2/r)/\left[1 + \{1 - (K+1)(y/r)^2\}^{1/2}\right] + A_4 \cdot y^4 + A_6 \cdot y^6 + A_8 \cdot y^8 + A_{10} \cdot y^{10} + A_{12} \cdot y^{12} + A_{14} \cdot y^{14} + A_{16} \cdot y^{16},$$

in which r is a paraxial radius of curvature of the aspherical surface, K is a conical coefficient and $A_4$ to $A_{16}$ are 4th-order to 16th-order aspherical coefficients.

A value of the aspherical coefficient, for example, a value of A4 of the aspherical surface 3 of Example 1 is represented by 2.22290e-05, but this means $2.22290 \times 10^{-5}$.

In zoom data, WE is a wide-angle end, M1, M2 and M3 are states shown in FIGS. 1B, 1C and 1D, respectively, and TE is a telephoto end.

TABLE 1

(Numerical Data)

| Surface No. | R | D | Nd | Vd |
|---|---|---|---|---|
| 1 | 17.547 | 0.806 | 1.84666 | 23.78 |
| 2 | 12.113 | 3.328 | 1.58313 | 59.38 |
| 3 | −51.993 ASP | D3 | | |
| 4 | −12.716 ASP | 0.903 | 1.80610 | 40.92 |
| 5 | 4.886 ASP | 0.799 | | |
| 6 | 6.865 | 2.070 | 1.92286 | 18.90 |
| 7 | 15.092 | D7 | | |
| 8 | ∞ (Aperture stop) | 0.100 | | |
| 9 | 4.875 ASP | 1.603 | 1.51633 | 64.14 |
| 10 | −10.936 ASP | 0.100 | | |
| 11 | 7.923 | 2.002 | 1.77250 | 49.60 |
| 12 | −5.497 | 0.396 | 1.74950 | 35.28 |
| 13 | 3.424 | 0.809 | | |
| 14 | ∞ | D14 | | |
| 15 | 23.383 ASP | 1.873 | 1.74330 | 49.33 |
| 16 | −26.955 | D16 | | |
| 17 | ∞ | 0.400 | 1.54771 | 62.84 |
| 18 | ∞ | 0.500 | | |
| 19 | ∞ | 0.500 | 1.51633 | 64.14 |
| 20 | ∞ | 0.370 | | |
| 21 | ∞ (P) | | | |

TABLE 2

(Aspherical Coefficient)

| Surface No. | 3 | 4 | 5 | 9 |
|---|---|---|---|---|
| R | −51.993 | −12.716 | 4.886 | 4.875 |
| k | 0.000 | 0.089 | −0.406 | −0.227 |
| A4 | 2.22290e−05 | 4.97970e−04 | −1.65140e−04 | −1.20460e−03 |
| A6 | 3.21270e−08 | 8.92410e−06 | 8.13600e−05 | −4.75530e−06 |
| A8 | −6.34460e−10 | −6.09010e−07 | −4.74940e−06 | 1.28240e−05 |
| A10 | −1.31080e−11 | 9.71730e−09 | 1.09450e−07 | −2.23310e−07 |

| Surface No. | 10 | 16 |
|---|---|---|
| R | −10.936 | 23.383 |
| k | 0.000 | −1.490 |
| A4 | 5.67890e−04 | 1.55200e−04 |
| A6 | −7.21830e−06 | 1.41210e−06 |
| A8 | 1.35190e−05 | −1.02530e−12 |
| A10 | 0 | −2.39420e−09 |
| A12 | 0 | 1.75310e−11 |
| A14 | 0 | 2.01960e−11 |
| A16 | 0 | −7.59938e−13 |

TABLE 3

(Zoom Data)

| | WE | M1 | M2 | M3 | TE |
|---|---|---|---|---|---|
| fL | 6.52 | 10.34 | 16.32 | 22.52 | 31.49 |
| Fno | 3.34 | 4.13 | 4.69 | 4.94 | 5.13 |
| 2ω | 66.65 | 41.31 | 26.22 | 19.19 | 13.72 |
| D4 | 0.888 | 3.391 | 6.624 | 8.834 | 11.201 |
| D8 | 9.594 | 7.371 | 5.056 | 3.198 | 1.53 |
| D12 | 2.588 | 6.839 | 9.075 | 9.881 | 10.843 |
| D14 | 3.970 | 2.889 | 2.921 | 3.487 | 2.806 |

EXAMPLE 2

Figure 3B:
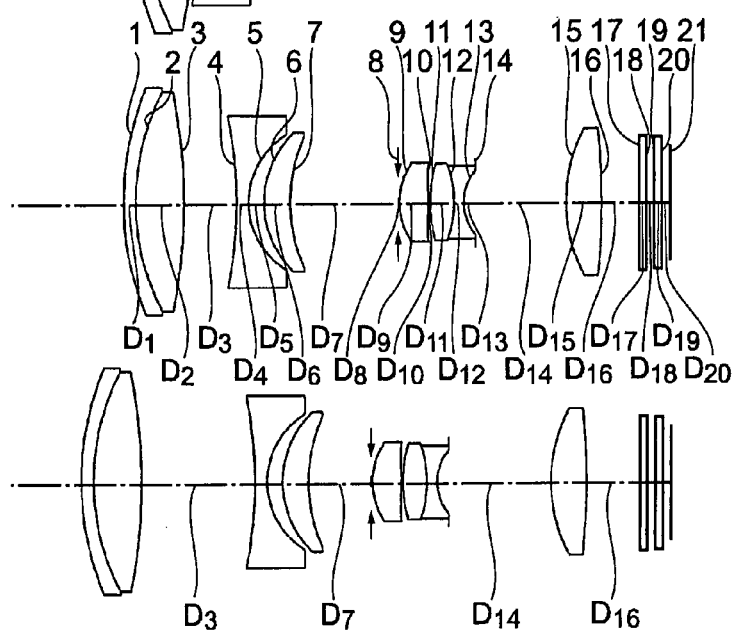
Figure 3C:
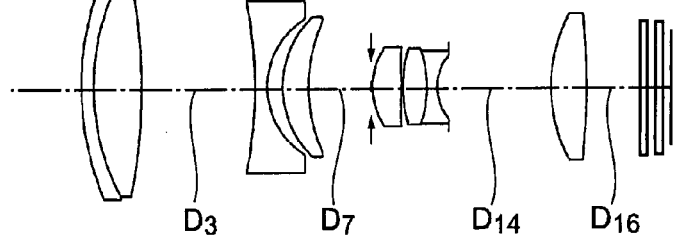
Figure 3D:
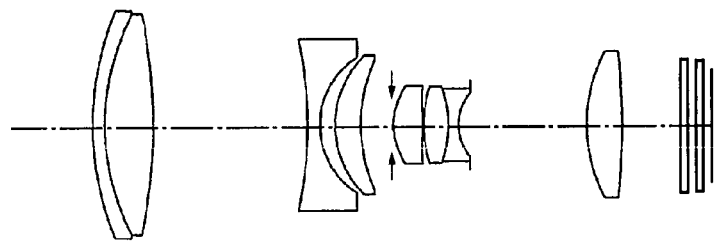
Figure 3E:
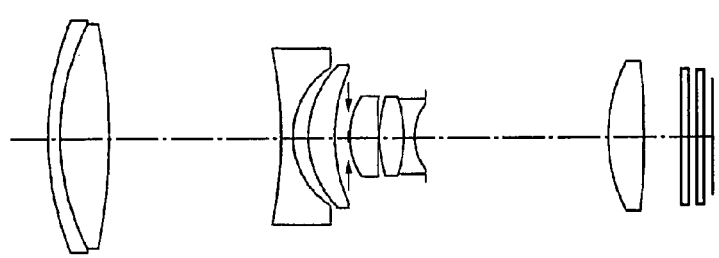

FIGS. 3A to 3E are sectional views of Example 2 along an optical axis, FIG. 3A shows an arrangement of lens units in a wide-angle end, FIGS. 3B, 3C and 3D show arrangements of the lens units in three states between the wide-angle end and a telephoto end, and FIG. 3E shows an arrangement of the lens units in the telephoto end, respectively. A focal length increases in order of FIGS. 3A, 3B, 3C, 3D and 3E.

Figure 4A:
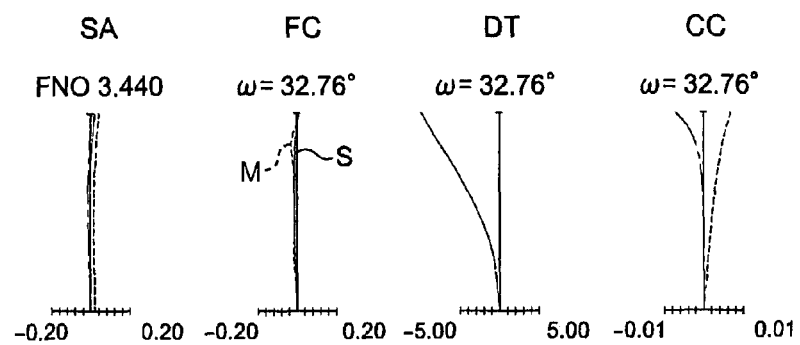
FIGS. 4A to 4C are aberration diagrams showing a spherical aberration (SA), an astigmatism (FC), a distortion (DT) and a chromatic aberration (CC) of magnification of Example 2 when focused on an infinite object.
Figure 4B:
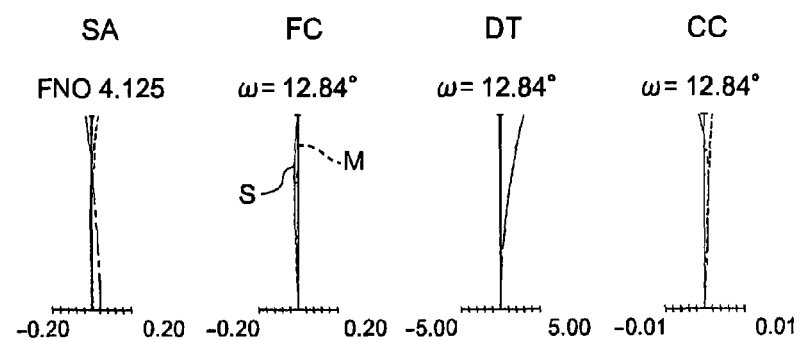
Figure 4C:
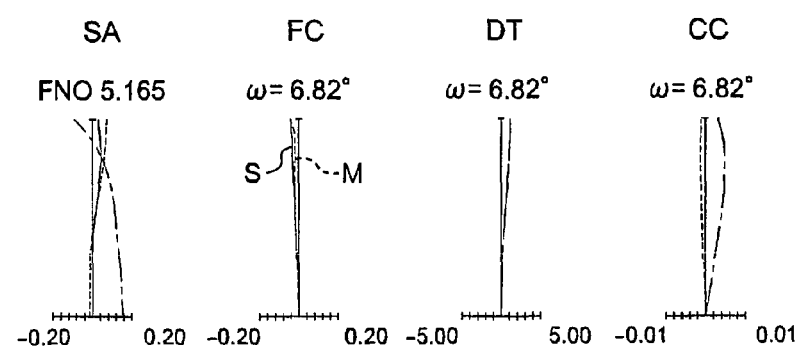

FIGS. 4A to 4C are aberration diagrams showing a spherical aberration (SA), an astigmatism (FC), a distortion (DT) and a chromatic aberration (CC) of magnification of Example 2 when focused on an infinite object, FIG. 4A shows aberrations in the wide-angle end, FIG. 4B shows aberrations in the state shown in FIG. 3C, and FIG. 4C shows aberrations in the telephoto end.

As shown, a zoom lens system of Example 2 includes, in order from an object side, a positive first lens unit G21 a negative second lens unit G22, an aperture stop S, a positive third lens unit G23, a flare stop F and a positive fourth lens unit G24.

The first lens unit G21 is constituted of, in order from the object side, a negative meniscus lens L21 whose convex surface faces the object side and a double convex positive lens L22 whose image-side surface is an aspherical surface, and these two lenses L21 and L22 are cemented. The second lens unit G22 is constituted of, in order from the object side, a double concave negative lens L23 whose opposite surfaces are aspherical surfaces, and a positive meniscus lens L24 whose convex surface faces the object side. The third lens unit G23 is constituted of, in order from the object side, a double convex positive lens L25 whose opposite surfaces are aspherical surfaces, a double convex positive lens L26 and a double concave negative lens L27, and two lenses L26 and L27 are cemented. The fourth lens unit G24 is constituted of a double convex positive lens L28 whose object-side surface is an aspherical surface. The parallel plane plate FL1 is a low pass filter on at least on of the surfaces of which is coated with infrared cut coating, and FL2 is a cover glass of the CCD image sensor.

In the zoom lens system of Example 2, during magnification change from the wide-angle end to the telephoto end, the first lens unit G21 moves toward the object side. The second lens unit G22 once moves toward the image side. Subsequently, after an intermediate focal length state (between the intermediate focal length state and the telephoto end), the movement direction reverses and the unit moves toward the object side. The third lens unit G23 moves toward the object side. The fourth lens unit G24 once moves toward the object side. Subsequently, after the intermediate focal length state (between the intermediate focal length state and the telephoto end), the movement direction reverses and the unit moves toward the image side.

Moreover, in Example 2, an image height is 3.84 mm, a focal length is 6.61 to 10.23 to 16.36 to 23.10 to 31.75 mm, and Fno is 3.44 to 3.80 to 4.13 to 4.36 to 5.17.

TABLE 4

(Numerical Data)

| Surface No. | R | D | Nd | Vd |
|---|---|---|---|---|
| 1 | 21.131 | 0.800 | 1.84666 | 23.78 |
| 2 | 16.243 | 3.250 | 1.49700 | 81.54 |
| 3 | −31.280 ASP | D3 | | |
| 4 | −20.143 ASP | 0.800 | 1.80610 | 40.88 |
| 5 | 5.121 ASP | 1.027 | | |
| 6 | 6.603 | 1.762 | 1.92286 | 18.90 |
| 7 | 11.070 | D7 | | |
| 8 | ∞ (Aperture Stop) | 0.100 | | |
| 9 | 4.877 ASP | 1.910 | 1.56384 | 60.67 |
| 10 | −28.445 ASP | 0.100 | | |
| 11 | 10.231 | 1.660 | 1.88300 | 40.76 |
| 12 | −7.561 | 0.700 | 1.69895 | 30.13 |
| 13 | 3.556 | 0.800 | | |
| 14 | ∞ | D14 | | |
| 15 | 11.784 ASP | 2.400 | 1.51633 | 64.14 |
| 16 | −39.468 | D16 | | |
| 17 | ∞ | 0.500 | 1.54771 | 62.84 |
| 18 | ∞ | 0.500 | | |
| 19 | ∞ | 0.500 | 1.51633 | 64.14 |
| 20 | ∞ | 0.590 | | |
| 21 | ∞ (P) | | | |

TABLE 5

(Aspherical Coefficient)

| | Surface No. | | | |
|---|---|---|---|---|
| | 3 | 4 | 5 | 9 |
| R | −31.280 | −20.143 | 5.121 | 4.877 |
| k | 0.000 | 0.000 | −0.192 | 0.281 |
| A4 | 3.43788e−05 | −3.74820e−05 | −3.30754e−04 | −6.27098e−04 |
| A6 | 4.33169e−08 | 1.64482e−05 | 2.71844e−05 | 6.31717e−05 |
| A8 | −3.14573e−09 | −5.41840e−07 | −1.30015e−06 | −7.08095e−06 |
| A10 | 3.63435e−11 | 6.88617e−09 | 3.47164e−08 | 1.82784e−06 |

| | Surface No. | |
|---|---|---|
| | 10 | 15 |
| R | −28.445 | 11.784 |
| k | 0.000 | 1.426 |
| A4 | 1.68212e−03 | 3.60839e−05 |
| A6 | 1.68169e−04 | 0 |
| A8 | −2.07636e−05 | 0 |
| A10 | 4.64627e−06 | 0 |

TABLE 6

(Zoom Data)

| | WE | M1 | M2 | M3 | TE |
|---|---|---|---|---|---|
| fL | 6.61 | 10.23 | 16.36 | 23.1 | 31.75 |
| Fno | 3.44 | 3.8 | 4.13 | 4.36 | 5.17 |
| 2ω | 65.53 | 41.1 | 25.68 | 18.4 | 13.64 |
| D3 | 0.527 | 3.535 | 7.604 | 10.327 | 11.47 |
| D7 | 11.42 | 7.213 | 4.102 | 2.096 | 0.9 |
| D14 | 5.432 | 6.126 | 6.915 | 7.896 | 12.236 |
| D16 | 1.299 | 2.553 | 3.581 | 3.855 | 2.495 |

EXAMPLE 3

Figure 5A:
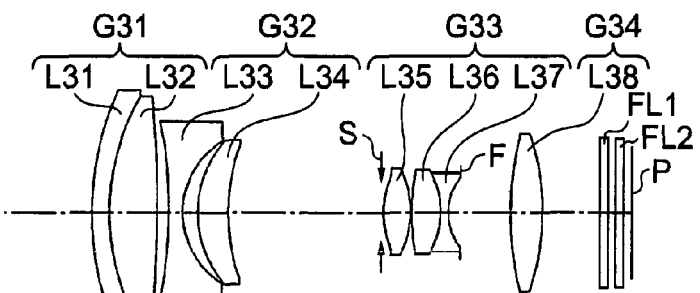
FIGS. 5A to 5E are sectional views of Example 3 of the present invention along an optical axis.
Figure 5B:
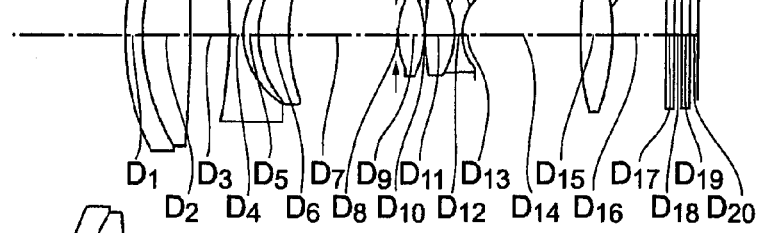
Figure 5C:
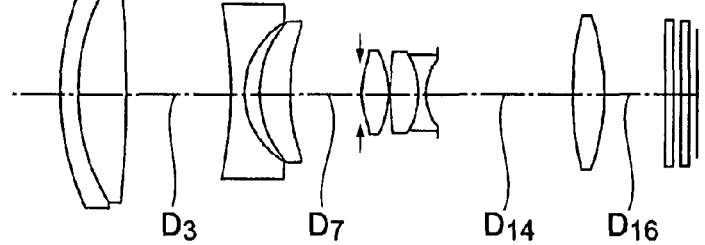
Figure 5D:
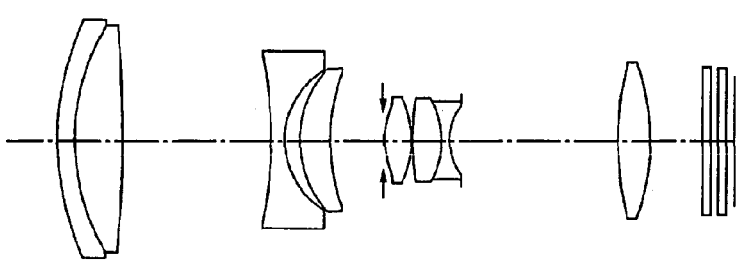
Figure 5E:
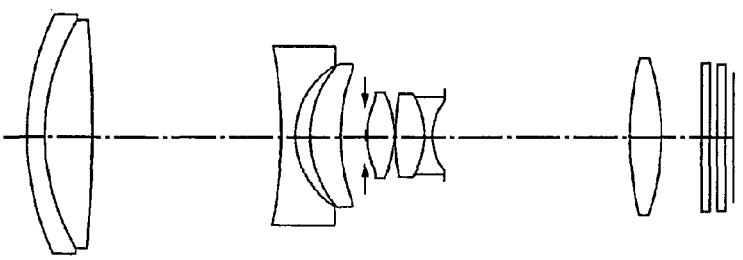

FIGS. 5A to 5E are sectional views of Example 3 along an optical axis, FIG. 5A shows an arrangement of lens units in a wide-angle end, FIGS. 5B, 5C and 5D show arrangements of the lens units in three states between the wide-angle end and a telephoto end, and FIG. 5E shows an arrangement of the lens units in the telephoto end, respectively. A focal length increases in order of FIGS. 5A, 5B, 5C, 5D and 5E.

Figure 6A:
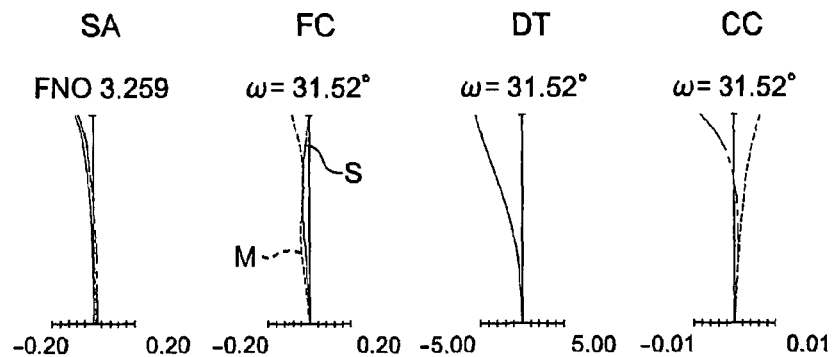
FIGS. 6A to 6C are aberration diagrams showing a spherical aberration (SA), an astigmatism (FC), a distortion (DT) and a chromatic aberration (CC) of magnification of Example 3 when focused on an infinite object.
Figure 6B:
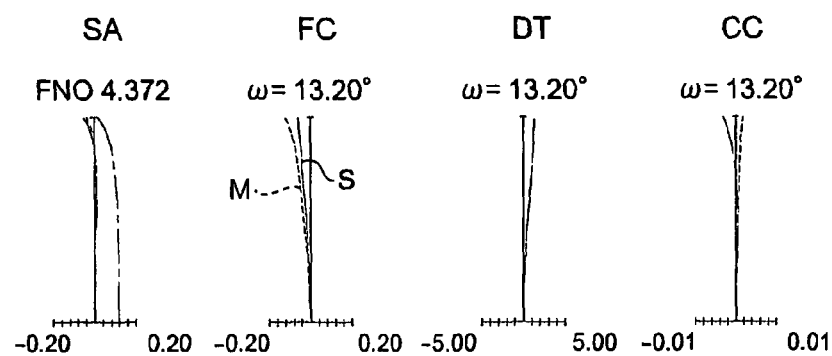
Figure 6C:
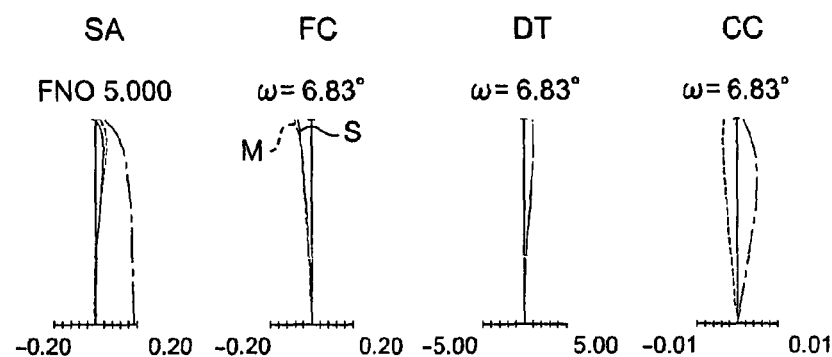

FIGS. 6A to 6C are aberration diagrams showing a spherical aberration (SA), an astigmatism (FC), a distortion (DT) and a chromatic aberration (CC) of magnification of Example 3 when focused on an infinite object, FIG. 6A shows aberrations in the wide-angle end, FIG. 6B shows aberrations in the state shown in FIG. 5C, and FIG. 6C shows aberrations in the telephoto end.

As shown, a zoom lens system of Example 3 includes, in order from an object side, a positive first lens unit G31 a negative second lens unit G32, an aperture stop S, a positive third lens unit G33, a flare stop F and a positive fourth lens unit G34. Parallel plane plates FL1 and FL2 are arranged on an image side of the fourth lens unit G34. The image surface is indicated as P. When the zoom lens system is used with a CCD image sensor, the light receiving surface of the CCD image sensor is placed on the image surface P.

The first lens unit G31 is constituted of, in order from the object side, a negative meniscus lens L31 whose convex surface faces the object side and a double convex positive lens L32 whose image-side surface is an aspherical surface, and these two lenses L31 and L32 are cemented. The second lens unit G32 is constituted of, in order from the object side, a double concave negative lens L33 having aspherical surfaces, and a positive meniscus lens L34 whose convex surface faces the object side. The third lens unit G33 is constituted of a double convex positive lens L35 whose opposite surfaces are aspherical surfaces, a double convex positive lens L36 and a double concave negative lens L37, and two lenses L36 and L37 are cemented. The fourth lens unit G34 is constituted of a double convex positive lens whose object-side surface is an aspherical surface. The parallel plane plate FL1 is a low pass filter on at least on of the surfaces of which is coated with infrared cut coating, and FL2 is a cover glass of the CCD image sensor.

In the zoom lens system of Example 3, during magnification change from the wide-angle end to the telephoto end, the first lens unit G31 moves toward the object side. The second lens unit G32 once moves toward the object side. Subsequently, the movement direction reverses before reaching an intermediate focal length state (between the wide-angle end and the intermediate focal length state) and the unit moves toward the image side. The third lens unit G33 moves toward the object side. The fourth lens unit G34 once moves toward the image side. Subsequently, the movement direction reverses before reaching the intermediate focal length state (between the wide-angle end and the intermediate focal length state) and the unit moves toward the object side. Furthermore, in the vicinity of the intermediate focal length state, the movement direction reverses and the unit moves toward the image side.

Moreover, in Example 3, an image height is 3.84 mm, a focal length is 6.61 to 10.13 to 16.15 to 21.92 to 31.73 mm, and Fno is 3.26 to 3.97 to 4.37 to 4.62 to 5.00.

TABLE 7

(Numerical Data)

| Surface No. | R | D | Nd | Vd |
|---|---|---|---|---|
| 1 | 19.078 | 1.100 | 1.92286 | 20.88 |
| 2 | 14.113 | 3.150 | 1.58313 | 59.46 |
| 3 | −58.921 ASP | D3 | | |
| 4 | −18.603 ASP | 0.900 | 1.80610 | 40.88 |
| 5 | 4.824 ASP | 0.918 | | |
| 6 | 6.775 | 2.000 | 1.92286 | 18.90 |
| 7 | 12.917 | D7 | | |
| 8 | ∞ (Aperture stop) | 0.100 | | |
| 9 | 5.507 ASP | 1.700 | 1.58313 | 59.46 |
| 10 | −8.650 ASP | 0.100 | | |
| 11 | 18.628 | 1.900 | 1.83400 | 37.16 |
| 12 | −4.831 | 0.500 | 1.69895 | 30.13 |
| 13 | 3.538 | 0.800 | | |
| 14 | ∞ | D14 | | |
| 15 | 22.547 ASP | 2.100 | 1.58313 | 59.46 |
| 16 | −14.889 | D16 | | |
| 17 | ∞ | 0.500 | 1.54771 | 62.84 |
| 18 | ∞ | 0.500 | | |
| 19 | ∞ | 0.500 | 1.51633 | 64.14 |
| 20 | ∞ | 0.540 | | |
| 21 | ∞ (P) | | | |

TABLE 8

(Aspherical Coefficient)

| Surface No. | | | | |
|---|---|---|---|---|
| | 3 | 4 | 5 | 9 |
| R | −58.921 | −18.603 | 4.824 | 5.507 |
| k | 0.000 | 0.000 | −2.442 | −3.649 |

TABLE 8-continued (Aspherical Coefficient)

| | | | | |
|---|---|---|---|---|
| A4 | 1.95518e−05 | 2.67251e−04 | 2.15214e−03 | −3.50628e−05 |
| A6 | 3.57791e−08 | 3.47099e−06 | −9.21729e−06 | −1.35947e−04 |
| A8 | −1.67912e−09 | −1.96142e−07 | 1.17029e−07 | −1.65657e−05 |
| A10 | 1.69933e−11 | 2.74842e−09 | 1.59779e−08 | −3.41534e−06 |

| Surface No. | | |
|---|---|---|
| | 10 | 15 |
| R | −8.650 | 22.547 |
| k | 0.000 | −20.528 |
| A4 | −6.78892e−04 | 2.62461e−04 |
| A6 | 1.04973e−06 | 0 |
| A8 | −4.11558e−05 | 0 |

TABLE 9

(Zoom Data)

| | WE | M1 | M2 | M3 | TE |
|---|---|---|---|---|---|
| fL | 6.61 | 10.13 | 16.15 | 21.92 | 31.73 |
| Fno | 3.26 | 3.97 | 4.37 | 4.62 | 5 |
| 2ω | 63.04 | 41.97 | 26.41 | 19.57 | 13.66 |
| D3 | 0.77 | 2.506 | 6.816 | 9.646 | 12.167 |
| D7 | 9.942 | 6.944 | 4.495 | 3.38 | 1.62 |
| D14 | 3.15 | 6.765 | 8.635 | 10.09 | 11.932 |
| D16 | 3.797 | 3.703 | 4.116 | 3.500 | 2.621 |

EXAMPLE 4

Figure 7A:
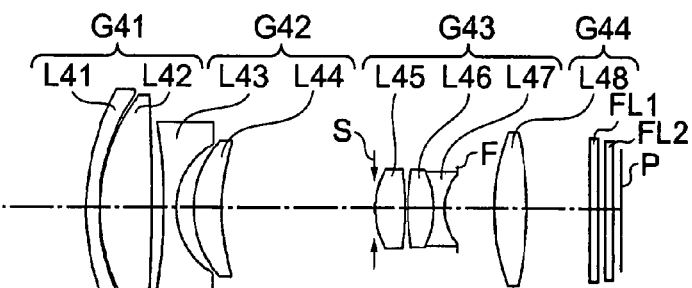
FIGS. 7A to 7E are sectional views of Example 4 of the present invention along an optical axis.
Figure 7B:
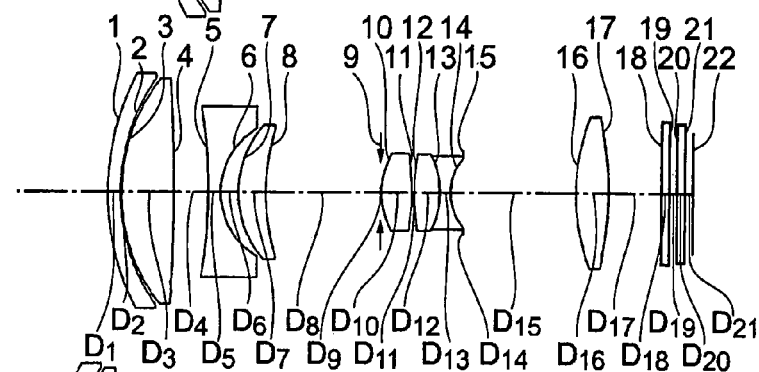
Figure 7C:
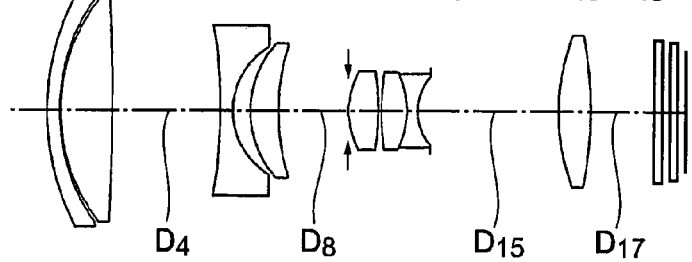
Figure 7D:
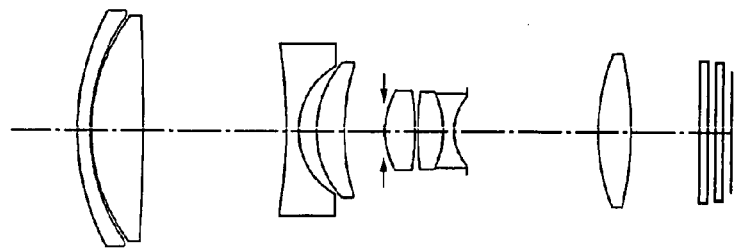
Figure 7E:
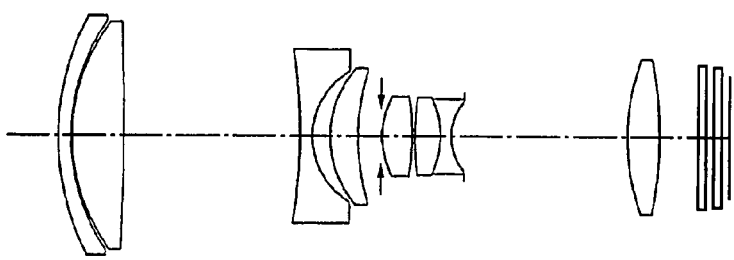

FIGS. 7A to 7E are sectional views of Example 4 along an optical axis, FIG. 7A shows an arrangement of lens units in a wide-angle end, FIGS. 7B, 7C and 7D show arrangements of the lens units in three states between the wide-angle end and a telephoto and, and FIG. 7E shows an arrangement of the lens units in the telephoto end, respectively. A focal length increases in order of FIGS. 7A, 7B, 7C, 7D and 7E.

Figure 8A:
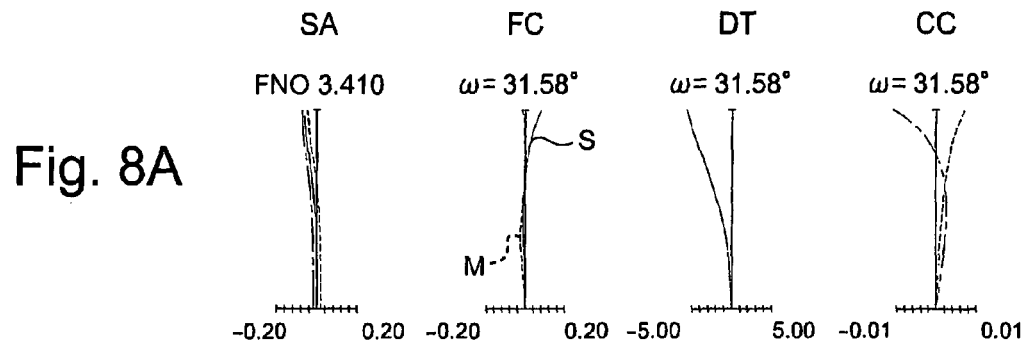
FIGS. 8A to 8C are aberration diagrams showing a spherical aberration (SA), an astigmatism (FC), a distortion (DT) and a chromatic aberration (CC) of magnification of Example 4 when focused on an infinite object.
Figure 8B:
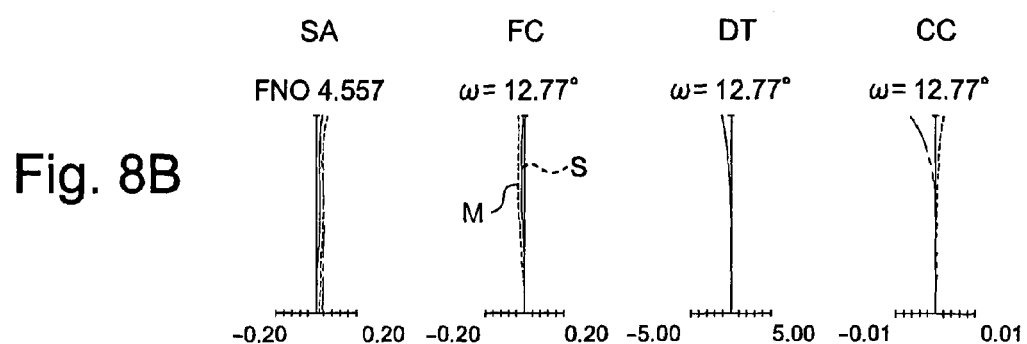
Figure 8C:
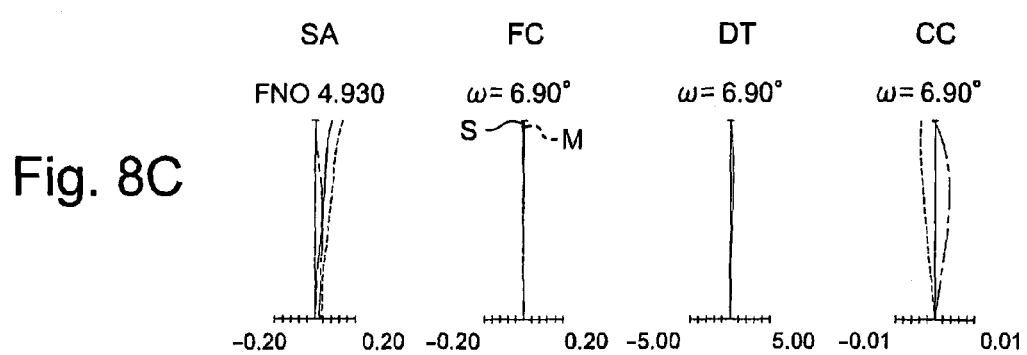

FIGS. 8A to 8C are aberration diagrams showing a spherical aberration (SA), an astigmatism (FC), a distortion (DT) and a chromatic aberration (CC) of magnification of Example 4 when focused on an infinite object, FIG. 8A shows aberrations in the wide-angle end, FIG. 8B shows aberrations in the state shown in FIG. 7C, and FIG. 8C shows aberrations in the telephoto end.

As shown, a zoom lens system of Example 4 includes, in order from an object side, a positive first lens unit G41 a negative second lens unit G42, an aperture stop S, a positive third lens unit G43, a flare stop F and a positive fourth lens unit G44. Parallel plane plates FL1 and FL2 are arranged on an image side of the fourth lens unit G44. The image surface is indicated as P. When the zoom lens system is used with a CCD image sensor, the light receiving surface of the CCD image sensor is placed on the image surface P.

The first lens unit G41 is constituted of, in order from the object side, a negative meniscus lens L41 whose convex surface faces the object side and a double convex positive lens L42 whose opposite surfaces are aspherical surfaces. The second lens unit G42 is constituted of, in order from the object side, a double concave negative lens L43 whose opposite surfaces are aspherical surfaces, and a positive meniscus lens L44 whose convex surface faces the object side. The third lens unit G43 is constituted of, in order from the object side, a double convex positive lens L45 whose opposite surfaces are aspherical surfaces, a double convex positive lens L46 and a double concave negative lens L47, and two lenses L46 and L47 are cemented. The fourth lens unit G44 is constituted of a double convex positive lens whose object-side surface is an aspherical surface.

In the zoom lens system of Example 4, during magnification change from the wide-angle end to the telephoto end, the first lens unit G41 moves toward the object side. The second lens unit G42 once moves toward the object side. Subsequently, the movement direction reverses before reaching an intermediate focal length state (between the wide-angle end and the intermediate focal length state) and the unit moves toward the image side. The third lens unit G43 moves toward the object side. The fourth lens unit G44 once moves toward the image side. Subsequently, the movement direction reverses before reaching the intermediate focal length state (between the wide-angle end and the intermediate focal length state) and the unit moves toward the object side. Furthermore, after the intermediate focal length state (between the telephoto end and the intermediate focal length state), the movement direction reverses and the unit moves toward the image side.

Moreover, in Example 4, an image height is 3.84 mm, a focal length is 6.61 to 10.13 to 17.14 to 23.20 to 31.75 mm, and Fno is 3.41 to 4.29 to 4.56 to 4.64 to 4.93.

TABLE 10

(Numerical Data)

| Surface No. | R | D | Nd | Vd |
|---|---|---|---|---|
| 1 | 16.844 | 0.800 | 1.92286 | 20.88 |
| 2 | 12.784 | 0.102 | | |
| 3 | 12.170 ASP | 3.350 | 1.58913 | 61.28 |
| 4 | −80.304 ASP | D4 | | |
| 5 | −21.251 ASP | 0.800 | 1.80610 | 40.88 |
| 6 | 4.237 ASP | 1.128 | | |
| 7 | 6.732 | 1.800 | 1.92286 | 18.90 |
| 8 | 13.803 | D8 | | |
| 9 | ∞ (Aperture stop) | 0.100 | | |
| 10 | 5.271 ASP | 1.900 | 1.58313 | 59.46 |
| 11 | −12.812 ASP | 0.162 | | |
| 12 | 17.207 | 1.700 | 1.81600 | 46.62 |
| 13 | −5.540 | 0.700 | 1.66680 | 33.05 |
| 14 | 3.652 | 0.800 | | |
| 15 | ∞ | D15 | | |
| 16 | 16.176 ASP | 2.200 | 1.58913 | 61.28 |
| 17 | −21.830 | D17 | | |
| 18 | ∞ | 0.500 | 1.54771 | 62.84 |
| 19 | ∞ | 0.500 | | |
| 20 | ∞ | 0.500 | 1.51633 | 64.14 |
| 21 | ∞ | 0.590 | | |
| 22 | ∞ (P) | | | |

TABLE 11

(Aspherical Coefficient)

| | Surface No. | | | |
|---|---|---|---|---|
| | 3 | 4 | 5 | 6 |
| R | 12.170 | −80.304 | −21.251 | 4.237 |
| k | 0.000 | 0.000 | 0.000 | −0.506 |
| A4 | −4.30559e−06 | 2.56740e−05 | 9.26214e−05 | −2.89325e−04 |
| A6 | −1.00105e−08 | −3.85836e−08 | 1.46075e−05 | 2.96203e−05 |
| A8 | 0 | −5.49885e−10 | −5.55617e−07 | −7.14232e−07 |
| A10 | 0 | 1.58584e−11 | 7.56943e−09 | 1.38028e−08 |

TABLE 11-continued (Aspherical Coefficient)

| | Surface No. | | |
|---|---|---|---|
| | 10 | 11 | 16 |
| R | 5.271 | −12.812 | 16.176 |
| k | 0.173 | 0.000 | 2.340 |
| A4 | −1.32851e−03 | 7.76003e−04 | 1.21657e−04 |
| A6 | 2.46293e−05 | 3.28829e−05 | 0 |
| A8 | −3.40819e−06 | 0 | 0 |
| A10 | 7.87783e−08 | 0 | 0 |

TABLE 12

(Zoom Data)

| | WE | M1 | M2 | M3 | TE |
|---|---|---|---|---|---|
| fL | 6.61 | 10.13 | 17.14 | 23.2 | 31.75 |
| Fno | 3.41 | 4.29 | 4.56 | 4.64 | 4.93 |
| 2ω | 63.17 | 42.9 | 25.54 | 19.02 | 13.8 |
| D4 | 0.788 | 2.232 | 6.973 | 9.211 | 11.312 |
| D8 | 9.864 | 7.392 | 4.459 | 2.556 | 1.5 |
| D15 | 2.354 | 7.289 | 8.263 | 8.516 | 10.559 |
| D17 | 4.257 | 3.532 | 4.215 | 4.56 | 2.497 |

EXAMPLE 5

Figure 9A:
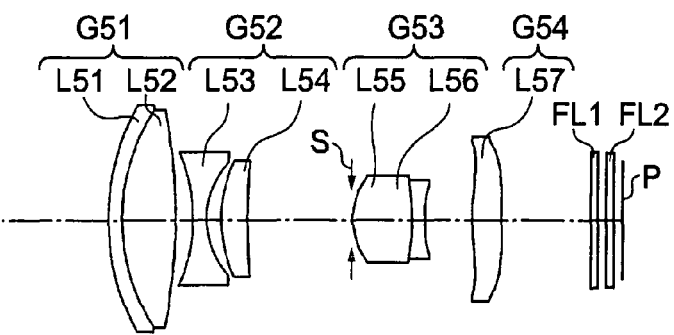
FIGS. 9A to 9E are sectional views of Example 5 of the present invention along an optical axis.
Figure 9B:
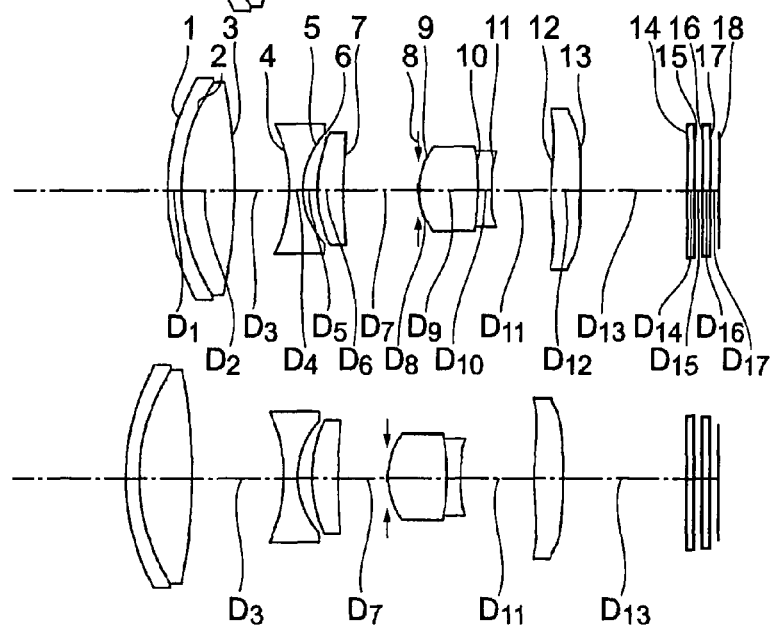
Figure 9C:
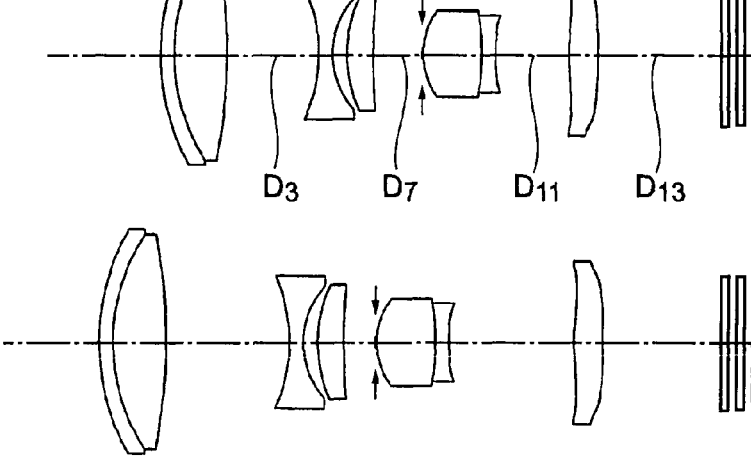
Figure 9D:
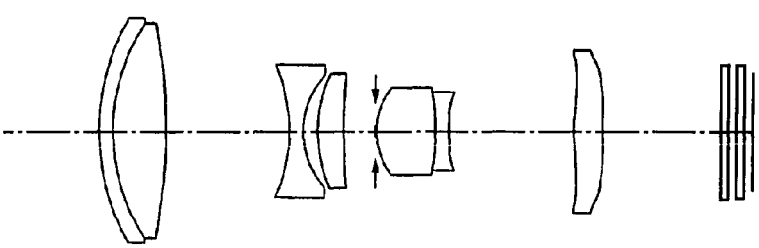
Figure 9E:
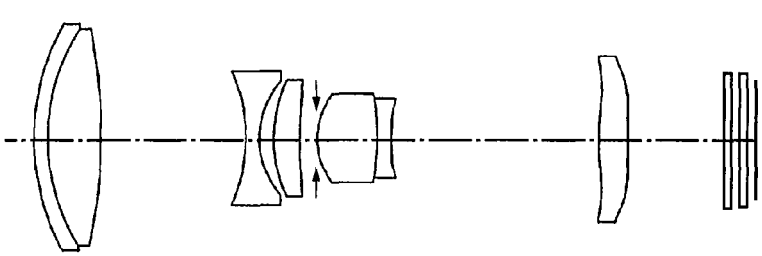

FIGS. 9A to 9E are sectional views of Example 5 along an optical axis, FIG. 9A shows an arrangement of lens units in a wide-angle end, FIGS. 9B, 9C and 9D show arrangements of the lens units in three states between the wide-angle end and a telephoto end, and FIG. 9E shows an arrangement of the lens units in the telephoto end, respectively. A focal length increases in order of FIGS. 9A, 9B, 9C, 9D and 9E.

Figure 10A:
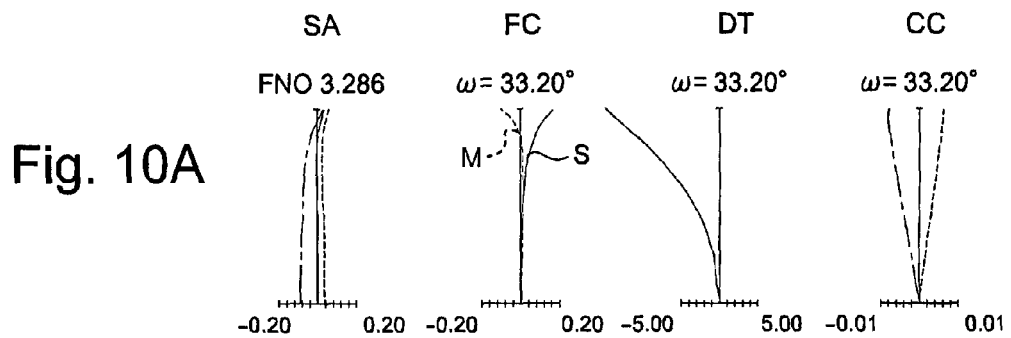
FIGS. 10A to 10C are aberration diagrams showing a spherical aberration (SA), an astigmatism (FC), a distortion (DT) and a chromatic aberration (CC) of magnification of Example 5 when focused on an infinite object.
Figure 10B:
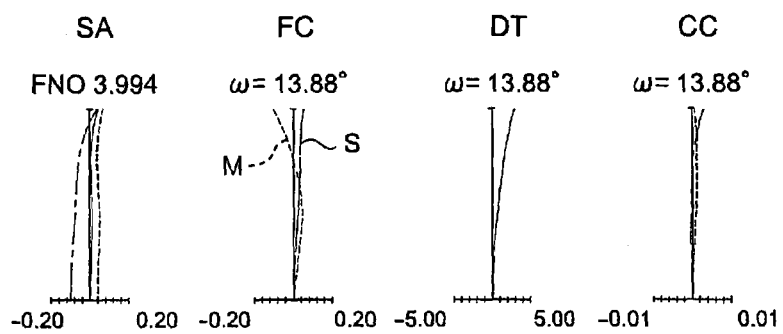
Figure 10C:
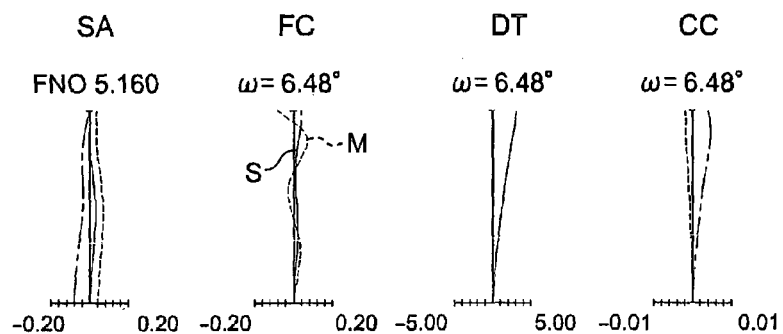

FIGS. 10A to 10C are aberration diagrams showing a spherical aberration (SA), an astigmatism (FC), a distortion (DT) and a chromatic aberration (CC) of magnification of Example 5 when focused on an infinite object, FIG. 10A shows aberrations in the wide-angle end, FIG. 10B shows aberrations in the state shown in FIG. 9C, and FIG. 10C shows aberrations in the telephoto end.

As shown, a zoom lens system of Example 5 includes, in order from an object side, a positive first lens unit G51 a negative second lens unit G52, an aperture stop S, a positive third lens unit G53 and a positive fourth lens unit G54. Parallel plane plates FL1 and FL2 are arranged on an image side of the fourth lens unit G54. The image surface is indicated as P. When the zoom lens system is used with a CCD image sensor, the light receiving surface of the CCD image sensor is placed on the image surface P.

The first lens unit G51 is constituted of, in order from the object side, a negative meniscus lens L51 whose convex surface faces the object side and a double convex positive lens L52 whose image-side surface is an aspherical surface, and these two lenses L51 and L52 are cemented. The second lens unit G52 is constituted of, in order from the object side, a double concave negative lens L53 whose opposite surfaces are aspherical surfaces, and a positive meniscus lens L54 whose convex surface faces the object side. The third lens unit G53 is constituted of a double convex positive lens L55 and a double concave negative lens L56 whose image-side surface is an aspherical surface, and these two lenses L55 and L56 are cemented. The fourth lens unit G54 is constituted of a double convex positive lens L57 whose opposite surfaces are aspherical surfaces.

In the zoom lens system of Example 5, during magnification change from the wide-angle end to the telephoto end, the first lens unit G51 moves toward the object side. The second lens unit G52 once moves toward the image side. Subsequently, the movement direction reverses before reaching an intermediate focal length state (between the wide-angle end and the intermediate focal length state) and the unit moves toward the object side. The third lens unit G53 moves toward the object side. The fourth lens unit G54 once moves toward the object side. Subsequently, in the vicinity of the intermediate focal length state, the movement direction reverses and the unit moves toward the image side.

Moreover, in Example 5, an image height is 3.80 mm, a focal length is 6.80 to 10.10 to 14.95 to 22.10 to 32.47 mm, and Fno is 3.29 to 3.66 to 4.00 to 4.44 to 5.16.

TABLE 13

(Numerical Data)

| Surface No. | R | D | Nd | Vd |
|---|---|---|---|---|
| 1 | 15.042 | 0.900 | 1.92286 | 18.90 |
| 2 | 12.868 | 3.469 | 1.49700 | 81.54 |
| 3 | −29.200 ASP | D3 | | |
| 4 | −8.161 ASP | 0.900 | 1.88300 | 40.76 |
| 5 | 4.702 ASP | 0.946 | | |
| 6 | 8.967 | 1.700 | 1.92286 | 18.90 |
| 7 | 48.545 | D7 | | |
| 8 | ∞ (Aperture stop) | 0.100 | | |
| 9 | 4.770 | 3.834 | 1.72916 | 54.68 |
| 10 | −14.556 | 0.900 | 1.84666 | 23.78 |
| 11 | 16.141 ASP | D11 | | |
| 12 | 27.554 ASP | 1.900 | 1.74320 | 49.34 |
| 13 | −41.037 ASP | D13 | | |
| 14 | ∞ | 0.500 | 1.54771 | 62.84 |
| 15 | ∞ | 0.500 | | |
| 16 | ∞ | 0.500 | 1.51633 | 64.14 |
| 17 | ∞ | 0.600 | | |
| 18 | ∞ (P) | | | |

TABLE 14

(Aspherical Coefficient)

| | Surface No. | | | |
|---|---|---|---|---|
| | 3 | 4 | 5 | 11 |
| R | −29.200 | −8.161 | 4.702 | 16.141 |
| k | −6.549 | −16.672 | −0.229 | −10.633 |
| A4 | 3.54953e−05 | −1.93339e−03 | 1.24912e−04 | 3.28941e−03 |
| A6 | 9.31006e−08 | 6.97597e−05 | −3.86680e−04 | 5.54320e−05 |
| A8 | −8.16434e−09 | 4.85947e−06 | 4.82554e−05 | 4.25192e−05 |
| A10 | 1.01788e−10 | −4.15553e−07 | −1.99103e−06 | −3.07332e−06 |
| A12 | 0 | 7.98697e−09 | 0 | 0 |

| | Surface No. | |
|---|---|---|
| | 12 | 13 |
| R | 27.554 | −41.037 |
| k | 1.413 | −469.916 |
| A4 | −3.30498e−04 | −9.41535e−04 |
| A6 | 1.09389e−05 | 4.48707e−05 |
| A8 | −4.33644e−06 | −4.94893e−06 |
| A10 | 1.24136e−07 | 1.21165e−07 |

TABLE 15

(Zoom Data)

| | WE | M1 | M2 | M3 | TE |
|---|---|---|---|---|---|
| fL | 6.8 | 10.1 | 14.95 | 22.1 | 32.47 |
| Fno | 3.29 | 3.66 | 3.99 | 4.44 | 5.16 |
| 2ω | 66.39 | 41.64 | 27.77 | 18.91 | 12.97 |
| D3 | 1.1 | 3.458 | 5.878 | 7.996 | 9.456 |
| D7 | 6.883 | 4.857 | 3.232 | 2.045 | 1 |
| D11 | 3.107 | 3.981 | 4.857 | 8.23 | 13.689 |
| D13 | 5.769 | 6.902 | 7.980 | 7.637 | 6.106 |

EXAMPLE 6

Figure 11A:
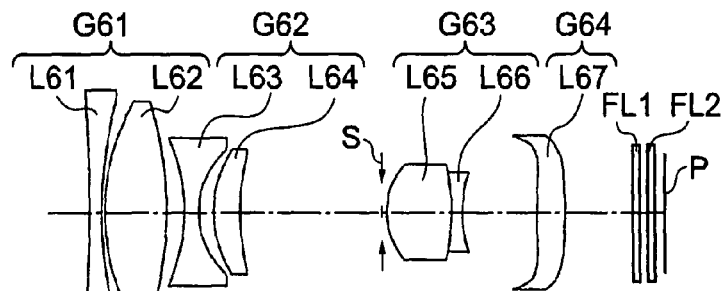
FIGS. 11A to 11E are sectional views of Example 6 of the present invention along an optical axis.
Figure 11B:
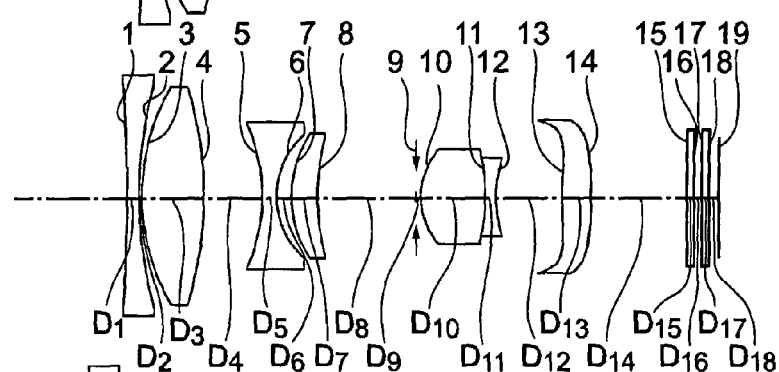
Figure 11C:
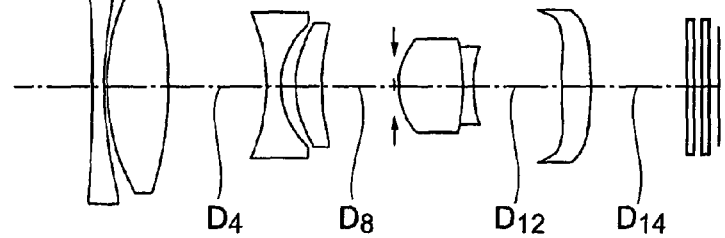
Figure 11D:
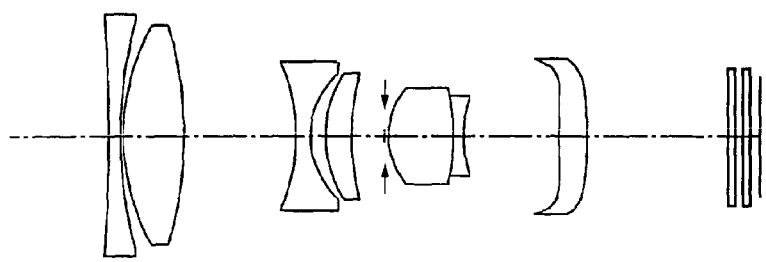
Figure 11E:
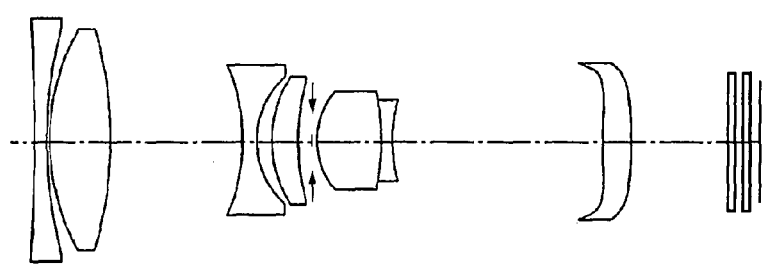

FIGS. 11A to 11E are sectional views of Example 6 along an optical axis, FIG. 11A shows an arrangement of lens units in a wide-angle end, FIGS. 11B, 11C and 11D show arrangements of the lens units in three states between the wide-angle end and a telephoto end, and FIG. 11E shows an arrangement of the lens units in the telephoto end, respectively. A focal length increases in order of FIGS. 11A, 11B, 11C, 11D and 11E.

Figure 12A:
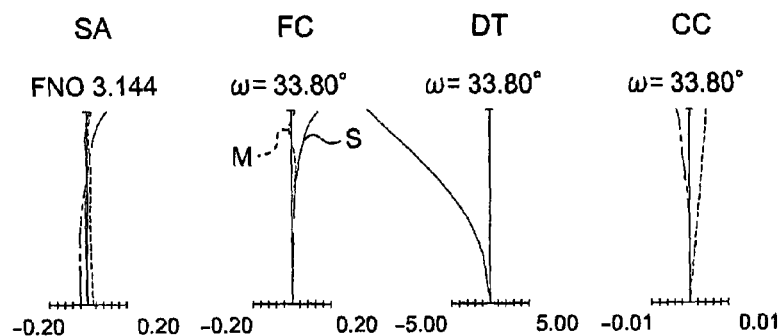
FIGS. 12A to 12C are aberration diagrams showing a spherical aberration (SA), an astigmatism (FC), a distortion (DT) and a chromatic aberration (CC) of magnification of Example 6 when focused on an infinite object.
Figure 12B:
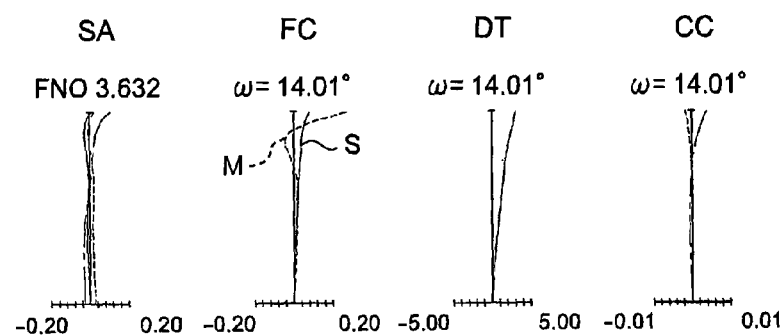
Figure 12C:
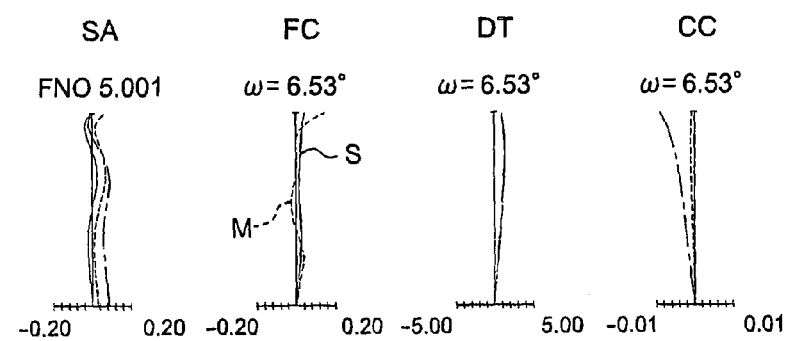

FIGS. 12A to 12C are aberration diagrams showing a spherical aberration (SA), an astigmatism (FC), a distortion (DT) and a chromatic aberration (CC) of magnification of Example 6 when focused on an infinite object, FIG. 12A shows aberrations in the wide-angle end, FIG. 12B shows aberrations in the state shown in FIG. 11C, and FIG. 12C shows aberrations in the telephoto end.

As shown, a zoom lens system of Example 6 includes, in order from an object side, a positive first lens unit G61 a negative second lens unit G62, an aperture stop S, a positive third lens unit G63 and a positive fourth lens unit G64. Parallel plane plates FL1 and FL2 are arranged on an image side of the fourth lens unit G64. The image surface is indicated as P. When the zoom lens system is used with a CCD image sensor, the light receiving surface of the CCD image sensor is placed on the image surface P.

The first lens unit G61 is constituted of, in order from the object side, a double concave negative lens L61 and a double convex positive lens L62 whose opposite surfaces are aspherical surfaces. The second lens unit G62 is constituted of a double concave negative lens L63 whose opposite surfaces are aspherical surfaces, and a positive meniscus lens L64 whose convex surface faces the object side. The third lens unit G63 is constituted of a double convex positive lens L65 and a double concave negative lens L66, and these two lenses L65 and L66 are cemented. The fourth lens unit G64 is constituted of a double convex positive lens L67 whose opposite surfaces are aspherical surfaces.

In the zoom lens system of Example 6, during magnification change from the wide-angle end to the telephoto end, the first lens unit G61 moves toward the object side. The second lens unit G62 once moves toward the image side. Subsequently, the movement direction reverses before reaching an intermediate focal length state (between the wide-angle end and intermediate focal length state) and the unit moves toward the object side. The third lens unit G63 moves toward the object side. The fourth lens unit G64 once moves toward the object side. Subsequently, the movement direction reverses before reaching the intermediate focal length state (between the wide-angle end and intermediate focal length state) and the unit moves toward the image side. Furthermore, in the vicinity of the intermediate focal length state, the movement direction reverses and the unit moves toward the object side.

Subsequently, after the intermediate focal length state (between the telephoto end and the intermediate focal length state), the movement direction reverses, and the unit moves toward the image side.

Moreover, in Example 6, an image height is 3.84 mm, a focal length is 6.72 to 10.10 to 14.80 to 22.14 to 32.89 mm, and Fno is 3.14 to 3.37 to 3.63 to 4.19 to 5.00.

TABLE 16

(Numerical Data)

| Surface No. | R | D | Nd | Vd |
|---|---|---|---|---|
| 1 | −98.083 | 0.800 | 2.00069 | 25.46 |
| 2 | 28.999 | 0.200 | | |
| 3 | 13.871 ASP | 4.000 | 1.74320 | 49.34 |
| 4 | −18.782 ASP | D4 | | |
| 5 | −8.080 ASP | 0.900 | 1.77250 | 49.60 |
| 6 | 5.187 ASP | 0.946 | | |
| 7 | 7.496 | 1.700 | 1.92286 | 18.90 |
| 8 | 15.803 | D8 | | |
| 9 | ∞ (Aperture stop) | 0.303 | | |
| 10 | 4.751 | 4.174 | 1.72916 | 54.68 |
| 11 | −13.632 | 0.700 | 1.84666 | 23.78 |
| 12 | 13.028 ASP | D12 | | |
| 13 | 58.675 ASP | 1.900 | 1.74320 | 49.34 |
| 14 | −31.793 ASP | D14 | | |
| 15 | ∞ | 0.500 | 1.54771 | 62.84 |
| 16 | ∞ | 0.500 | | |
| 17 | ∞ | 0.500 | 1.51633 | 64.14 |
| 18 | ∞ | 0.600 | | |
| 19 | ∞ (P) | | | |

TABLE 17

(Aspherical Coefficient)

| | Surface No. | | | |
|---|---|---|---|---|
| | 3 | 4 | 5 | 6 |
| R | 13.871 | −18.782 | −8.080 | 5.187 |
| k | 0.251 | −8.530 | −10.198 | −1.320 |
| A4 | 1.61518e−05 | 2.03188e−05 | −1.31225e−04 | 2.19700e−03 |
| A6 | −2.76258e−06 | −2.21974e−06 | −4.01517e−05 | −1.54581e−04 |
| A8 | 5.76931e−08 | 6.85474e−08 | 4.65102e−06 | 1.35340e−05 |
| A10 | −4.70760e−10 | −6.52439e−10 | −2.38759e−07 | −9.33151e−07 |
| A12 | 0 | 0 | 4.64521e−09 | 2.68339e−08 |

| | Surface No. | | |
|---|---|---|---|
| | 12 | 13 | 14 |
| R | 13.028 | 58.675 | −31.793 |
| k | −4.136 | −1978.115 | −18.018 |
| A4 | 3.18369e−03 | 1.07093e−04 | −8.05881e−04 |
| A6 | 3.13607e−04 | −1.07574e−04 | −8.41325e−06 |
| A8 | −5.48068e−05 | 7.45454e−06 | −1.49187e−07 |
| A10 | 1.02777e−05 | −3.42745e−07 | −5.14667e−08 |

TABLE 18

(Zoom Data)

| | WE | M1 | M2 | M3 | TE |
|---|---|---|---|---|---|
| fL | 6.72 | 10.1 | 14.8 | 22.14 | 32.89 |
| Fno | 3.14 | 3.37 | 3.63 | 4.19 | 5 |
| 2ω | 67.6 | 41.64 | 28.02 | 19.12 | 13.06 |
| D4 | 1.133 | 3.735 | 6.231 | 7.193 | 8.581 |
| D8 | 9.311 | 6.465 | 4.763 | 2.069 | 0.9 |
| D12 | 4.834 | 4.269 | 5.753 | 6.268 | 13.689 |
| D14 | 4.397 | 6.25 | 6.24 | 9.045 | 6.106 |

The numerical value of each embodiment regarding the above mentioned conditions is indicated below.

TABLE 19

| | Example | | | | | |
|---|---|---|---|---|---|---|
| | 1 | 2 | 3 | 4 | 5 | 6 |
| $f_T/f_{g1}$ | 1.17 | 1.08 | 1.08 | 1.22 | 1.45 | 1.60 |
| $f_T/f_{g2}$ | −4.69 | −4.24 | −4.40 | −4.61 | −6.36 | −5.70 |
| $f_T/f_{g3}$ | 3.58 | 3.47 | 3.36 | 3.26 | 3.79 | 3.64 |
| $f_T/f_{g4}$ | 1.84 | 1.78 | 2.02 | 1.97 | 1.45 | 1.17 |
| $f_{g1}/f_{Tg234}$ | 1.69 | 1.69 | 2.20 | 1.88 | 1.30 | 0.68 |
| $f_{g2}/f_{Tg34}$ | −0.44 | −0.44 | −0.38 | −0.43 | −0.35 | −0.43 |
| $f_{g3}/f_{Tg12}$ | −0.32 | −0.35 | −0.33 | −0.30 | −0.44 | −0.45 |
| $|D_{g1}/D|$ | 0.63 | 0.55 | 0.70 | 0.55 | 0.91 | 0.61 |
| $D_{g2}/D$ | 0.07 | 0.16 | 0.05 | 0.12 | −0.34 | −0.14 |
| $|D_{g3}/D|$ | 0.48 | 0.52 | 0.50 | 0.41 | 0.75 | 0.68 |
| (rL2f + rL2r)/(rL2f − rL2r) | −0.62 | −0.32 | −0.61 | −0.74 | −0.39 | −0.15 |
| (rL3f + rL3r)/(rL3f − rL3r) | 0.44 | 0.59 | 0.59 | 0.67 | 0.27 | 0.22 |
| (rL4r + rL4r)/(rL4f − rL4r) | −2.67 | 3.96 | −3.21 | −2.90 | −1.45 | −2.80 |
| (rL7f + rL7r)/(rL7f − rL7r) | 0.36 | 0.15 | 0.21 | −0.20 | −0.05 | 0.02 |
| rL2r/fg1 | 1.05 | 0.35 | 0.90 | 1.26 | 0.24 | 0.84 |
| $f_T/f_W$ | 4.83 | 4.80 | 4.80 | 4.80 | 4.77 | 4.90 |

In the above examples, to cut unnecessary light such as ghost or flare, in addition to the aperture stop, the flare stop may be disposed. The stop may be disposed on the object side of the first lens unit of each example, between the first lens unit and the second lens unit, between the second lens unit and the third lens unit, between the third lens unit and the fourth lens unit, or between the fourth lens unit and the image surface. The stop may be constituted as a frame which holds the lens in order to cut a flare ray, or another member may be disposed as the flare stop. Alternatively, a shield portion which functions as the flare stop may be disposed by a method such as printing or painting on the surface of an optical element such as the lens. Alternatively, a seal may be bonded as the flare stop on the surface of the optical element. A shape of an opening of the flare stop may be any shape such as a circular shape, an elliptic shape, a rectangular shape, a polygonal shape or a shape surrounded with function curves. In addition to cutting of a harmful light flux, a light flux such as coma flare in a periphery of the image surface may be cut.

Moreover, when the surface of each lens is coated with a anti-reflection coating, the ghost and the flare can be reduced. When a multilayered thin film is used as the anti-reflection coating, the ghost and the flare can preferably effectively be reduced. A lens surface, a cover glass or the like may be coated with an infrared cut coating.

In the above zoom lens system, it is preferable that focusing is performed by the fourth lens unit. However, the present invention is not limited to this example, and the focusing may be performed by the first lens unit, the second lens unit and the third lens unit. A plurality of lens units may be moved to perform the focusing. The whole lens system may be moved to perform the focusing.

Moreover, in a case where a CCD image sensor provided with a micro lens on an incidence side of a pixel is used as an image pickup element in an image pickup apparatus including the zoom lens system according to the present invention, a drop of brightness in a peripheral portion of an image can be reduced by shifting the micro lenses of the CCD image sensor. For example, design of the micro lens of the CCD image sensor can be changed depending on the incidence angle of a ray onto an image pickup surface at each image height. Alternatively, the drop of brightness in a peripheral portion of an image may be compensated by using image processing technique.

Furthermore, a distortion is intentionally generated in an optical system beforehand, and after photographing, image processing may be electrically performed to correct the distortion.

The zoom lens system according to the present invention may be constituted so as to simultaneously satisfy any combination of the above mentioned constitutions and conditions. This is more advantageous in achieving miniaturization, a high zoom ratio and a high performance.

Moreover, in a case where the zoom lens system according to the present invention is constituted as a four-unit zoom lens system, the miniaturization is preferably well balanced with the performance.

Furthermore, a new numerical condition may be set by using an upper limit value and a lower limit value of different conditions for the same parameter. For example, a new condition "$0.6 < f_7/f_{g1} < 2.0$" may be set by using the lower limit value of condition (1) and the upper limit value of condition (1-1).

The zoom lens system according to the present invention can be used in any type of image pickup apparatus using an electronic image pickup element such as a CCD image sensor or a CMOS image sensor, such as a camera having a collapsible lens barrel, or the like. An example will hereinafter be described.

Figure 13:
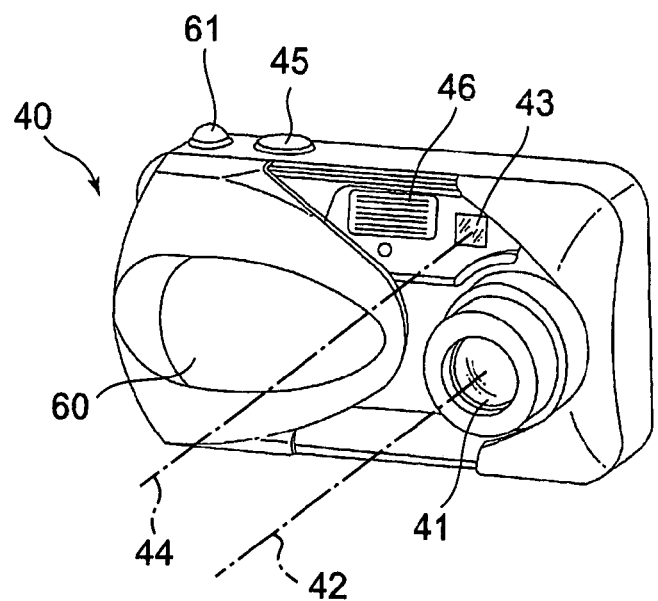
FIG. 13 is a front perspective view showing an appearance of an electronic camera to which a zoom lens system of the present invention is applied.
Figure 14:
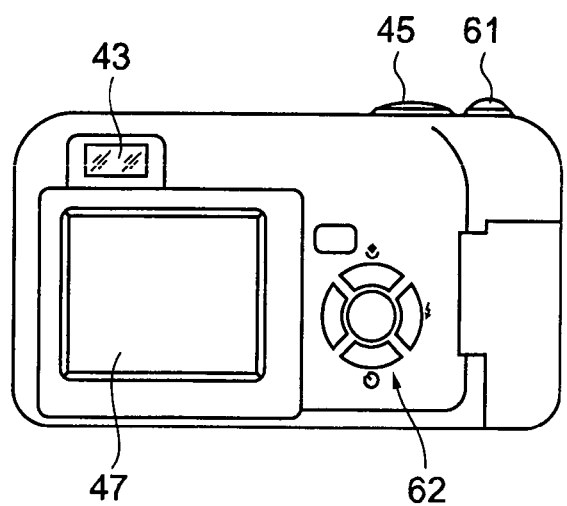
FIG. 14 is a rear view of the digital camera of FIG. 13.
Figure 15:
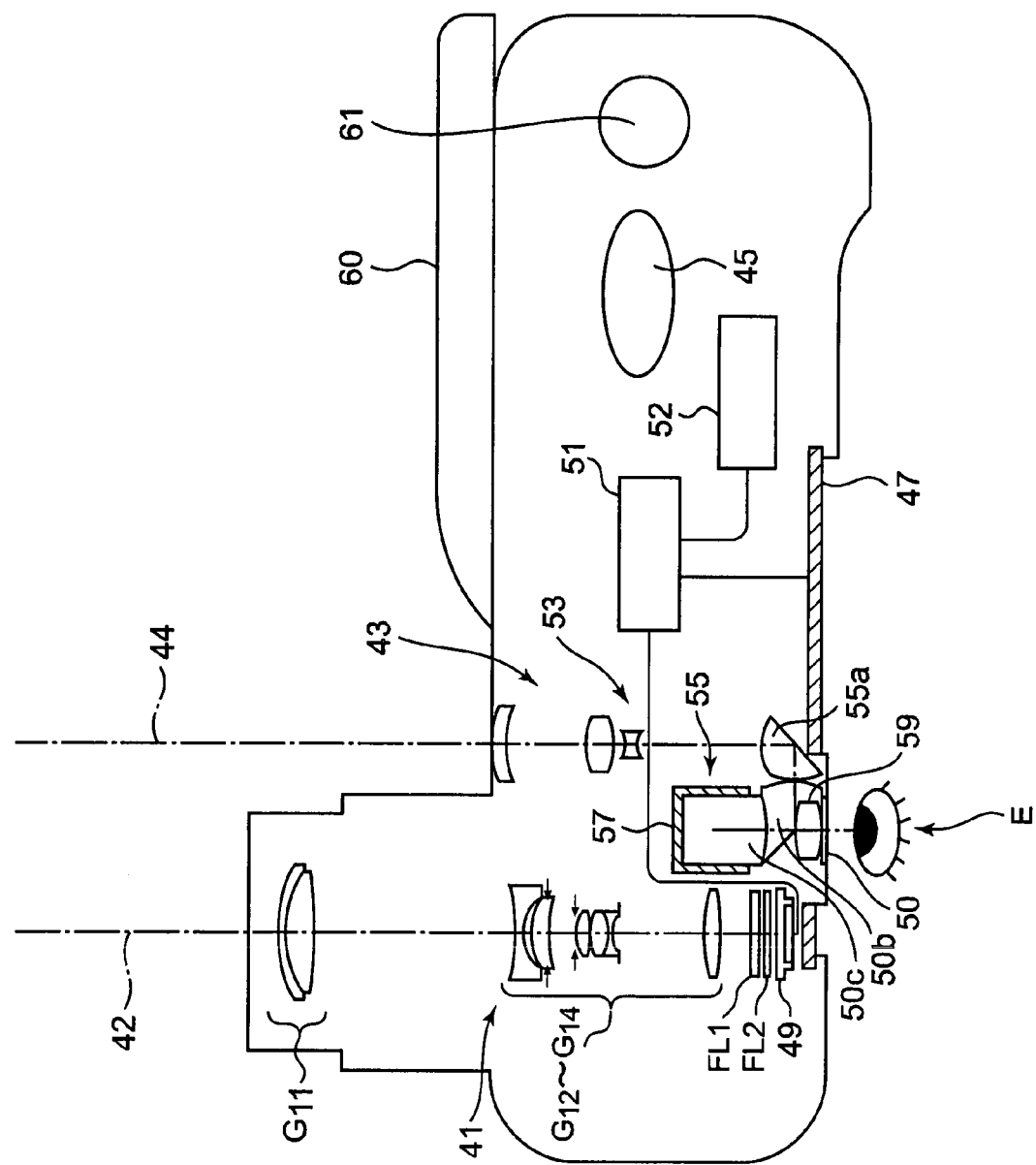
FIG. 15 is an explanatory view showing an arrangement of an optical system in the digital camera of FIG. 13.

FIGS. 13 to 15 are conceptual diagrams showing a constitution of a digital camera in which the zoom lens system according to the present invention is incorporated in a photographing optical system 41. FIG. 13 is a front perspective view showing an appearance of a digital camera 40, FIG. 14 is a rear view of the digital camera, and FIG. 15 is an explanatory view showing an arrangement of optical systems in the digital camera 40 with the proviso that FIGS. 13 and 15 show the photographing optical system 41 when non-collapsed.

In this example, the digital camera 40 includes the photographing optical system 41 positioned along a photographing optical path 42; a finder optical system 43 positioned along a finder optical path 44; a shutter button 45; a flashlight 46; a liquid crystal display monitor 47; a focal length change button 61; a setting change switch 62 and the like. When the photographing optical system 41 is collapsed, a cover 60 is slid to thereby cover the photographing optical system 41, the finder optical system 43 and the flashlight 46. Moreover, when the cover 60 is opened to bring the camera 40 into a photographing state, as shown in FIG. 15, the photographing optical system 41 is brought into a non-collapsed state. When the shutter button 45 disposed in an upper part of the camera 40 is pressed, the photographing is performed through the photographing optical system 41 in response to the pressing. An object image formed by the photographing optical system 41 is formed on an image pickup surface (a photoelectrical conversion surface) of a CCD image sensor 49 via a low pass filter FL having the surface coated with an IR cut coating and a cover class CG. The object image received by the CCD image sensor 49 is displayed as an electronic image in the liquid crystal display monitor 47 disposed on a rear surface of the camera via processing means 51. This processing means 51 is connected to recording means 52, and the photographed electronic image can be recorded. It is to be noted that this recording means 52 may be disposed separately from or integrally with the processing means 51. As the recording means, a memory or a hard disk drive (HDD) incorporated in the digital camera, an HDD detachably attachable to the digital camera, a memory card, a DVD or the like may be used.

Furthermore, a finder objective optical system 53 is disposed along the finder optical path 44. The finder objective optical system 53 is a zoom optical system constituted of a plurality of lens units (three lens units in the drawing) and an image erecting prism system 55 including prisms 55a, 55b and 55c, and is constituted so that a focal length changes in conjunction with the zoom lens system of the photographing optical system 41. An object image formed by this finder objective optical system 53 is formed in a view field frame 57 of the image erecting prism system 55. On an emission side of this image erecting prism system 55, an eyepiece optical system 59 which guides an erected image to an observer's eyeball E is disposed. On an emission side of the eyepiece optical system 59, a cover member 50 is disposed.

As the photographing optical system 41, the zoom lens system according to the present invention is used. In FIG. 15, the zoom lens system of Example 1 shown in FIG. 1A is used, but needless to say, another example is applicable.

The digital camera 40 constituted in this manner has the photographing optical system 41 which includes a zoom lens system having a high zoom ratio and satisfactorily corrected aberrations. Therefore, a high performance can be realized. Moreover, the photographing optical system 41 can be constituted of a smaller number of optical members, and can be, stored into the camera body by using a collapsible lens barrel. In consequence, miniaturization, thinning and cost reduction can be realized.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:

a first lens unit having a positive refractive power;
a second lens unit having a negative refractive power;
a third lens unit having a positive refractive power; and
a fourth lens unit having a positive refractive power,
wherein the first lens unit comprises a negative lens element and a positive lens element in order from the object side;
the second lens unit comprises a negative lens element and a positive lens element in order from the object side;
the third lens unit comprises a positive lens element, a positive lens element and a negative lens element in order from the object side;
the fourth lens unit comprises a positive lens element;
the total number of the lens elements of the first to fourth lens units is eight;
during magnification change from a wide-angle end to a telephoto end,
an interval between the first lens unit and the second lens unit, an interval between the second lens unit and the third lens unit and an interval between the third lens unit and the fourth lens unit change, and
the first lens unit moves,
the positive lens element in the first lens unit is a double convex lens, and
the negative lens element in the second lens unit is double concave lens having an aspherical surface.

2. The zoom lens system according to claim 1, further comprising:

an aperture stop which is disposed between the second lens unit and the third lens unit and which moves in an optical axis direction during the magnification change, wherein during the magnification change from the wide-angle end to the telephoto end, the first lens unit, the second lens unit, the third lens unit and the fourth lens unit move in the optical axis direction; and in the telephoto end than in the wide-angle end,
  the interval between the first lens unit and the second lens unit increases,
  the interval between the second lens unit and the third lens unit decreases,
  the third lens unit is positioned closer to the object side, and
  the aperture stop is positioned closer to the object side.

3. A zoom lens system comprising, in order from an object side:
  a first lens unit having a positive refractive power;
  a second lens unit having a negative refractive power;
  a third lens unit having a positive refractive power; and
  a fourth lens unit having a positive refractive power,
  wherein the first lens unit comprises a negative lens element and a positive lens element in order from the object side;
  the second lens unit comprises a negative lens element and a positive lens element in order from the object side;
  the third lens unit comprises a positive lens element and a negative lens element in order from the object side;
  the fourth lens unit comprises a positive lens element;
  the total number of the lens elements of the first to fourth lens units is seven;
  during magnification change from a wide-angle end to a telephoto end, an interval between the first lens unit and the second lens unit, an interval between the second lens unit and the third lens unit and an interval between the third lens unit and the fourth lens unit change;
  an aperture stop which moves in an optical axis direction during the magnification change is disposed between the second lens unit and the third lens unit;
  in the telephoto end than in the wide-angle end,
    the interval between the first lens unit and the second lens unit increases,
    the interval between the second lens unit and the third lens unit decreases,
    the third lens unit is positioned closer to the object side, and
    the aperture stop is positioned closer to the object side,
  the positive lens element in the first lens unit is a double convex lens, and
  the negative lens element in the second lens unit is double concave lens having an aspherical surface.

4. The zoom lens system according to claim 1, wherein the first lens unit is positioned closer to the object side in the telephoto end than in the wide-angle end.

5. An image pickup apparatus comprising:
  the zoom lens system according to claim 1; and
  an image pickup element which is disposed on an image side of the zoom lens system and which converts an optical image formed by the zoom lens system into an electric signal.

6. The zoom lens system according to claim 1, wherein the following condition (1) is satisfied:

$$0.6 < f_T/f_{g1} < 2.5 \quad (1),$$

in which $f_T$ is a focal length of the zoom lens system in the telephoto end, and $f_{g1}$ is a focal length of the first lens unit.

7. The zoom lens system according to claim 1, wherein the following condition (2) is satisfied:

$$-10 < f_T/f_{g2} < -2.5 \quad (2),$$

in which $f_T$ is a focal length of the zoom lens system in the telephoto end, and $f_{g2}$ is a focal length of the second lens unit.

8. The zoom lens system according to claim 1, wherein the following condition (3) is satisfied:

$$2 < f_T/f_{g3} < 7 \quad (3),$$

in which $f_T$ is a focal length of the zoom lens system in the telephoto end, and $f_{g3}$ is a focal length of the third lens unit.

9. The zoom lens system according to claim 1, wherein the following condition (4) is satisfied:

$$1.35 < f_T/f_{g4} < 5 \quad (4),$$

in which $f_T$ is a focal length of the zoom lens system in the telephoto end, and $f_{g4}$ is a focal length of the fourth lens unit.

10. The zoom lens system according to claim 1, wherein the following condition (5) is satisfied:

$$0.3 < f_{g1}/f_{Tg234} < 2.5 \quad (5),$$

in which $f_{g1}$ is a focal length of the first lens unit, and $f_{Tg234}$ is a focal length of a composite lens unit constituted of the second lens unit to the fourth lens unit in the telephoto end.

11. The zoom lens system according to claim 1, wherein the following condition (6) is satisfied:

$$-0.7 < f_{g2}/f_{Tg34} < -0.2 \quad (6),$$

in which $f_{g2}$ is a focal length of the second lens unit, and $f_{Tg34}$ is a focal length of a composite lens unit constituted of the third lens unit and the fourth lens unit in the telephoto end.

12. The zoom lens system according to claim 1, wherein the following condition (7) is satisfied:

$$-0.45 < f_{g3}/f_{Tg12} < -0.1 \quad (7),$$

in which $f_{g3}$ is a focal length of the third lens unit, and $f_{Tg12}$ is a focal length of a composite lens unit constituted of the first lens unit and the second lens unit in the telephoto end.

13. The zoom lens system according to claim 3, wherein the following condition (8) is satisfied:

$$-0.55 < f_{g3}/f_{Tg12} < -0.15 \quad (8),$$

in which $f_{g3}$ is a focal length of the third lens unit, and $f_{Tg12}$ is a focal length of a composite lens unit constituted of the first lens unit and the second lens unit in the telephoto end.

14. The zoom lens system according to claim 4, wherein the following condition (9) is satisfied:

$$0.2 < |D_{g1}/D| < 1.5 \quad (9),$$

in which $D_{g1}$ is a displacement amount of the first lens unit from the wide-angle end to the telephoto end, which is represented by a positive sign when the first lens unit is positioned closer to the image side in the telephoto end than in the wide-angle end, and D is a sum of thicknesses along an optical axis from incidence surfaces to emission surfaces of the first lens unit, the second lens unit, the third lens unit and the fourth lens unit.

15. The zoom lens system according to claim 1, wherein the following condition (10) is satisfied:

$$-0.4 < D_{g2}/D < 0.4 \quad (10),$$

in which $D_{g2}$ is a displacement amount of the second lens unit from the wide-angle end to the telephoto end, which is represented by a positive sign when the second lens unit is positioned closer to the image side in the telephoto end than in the wide-angle end, and D is a sum of thicknesses along an optical axis from incident surfaces to emission surfaces of the first lens unit, the second lens unit, the third lens unit and the fourth lens unit.

16. The zoom lens system according to claim 15, wherein the following condition (11) is satisfied:

$$0.01<|D_{g2}|/D \quad (11).$$

17. The zoom lens system according to claim 1, wherein during the magnification change from the wide-angle end to the telephoto end, the second lens unit moves toward the object side, then a movement direction reverses, and the unit moves toward an image side and is positioned closer to the image side in the telephoto end than in the wide-angle end; and the following condition is satisfied:

$$0.01<D_{g2}/D<0.25 \quad (12),$$

in which $D_{g2}$ is a displacement amount of the second lens unit from the wide-angle end to the telephoto end, which is represented by a positive sign when the second lens unit is positioned closer to the image side in the telephoto end than in the wide-angle end, and D is a sum of thicknesses along an optical axis from incidence surfaces to emission surfaces of the first lens unit, the second lens unit, the third lens unit and the fourth lens unit.

18. The zoom lens system according to claim 1, wherein the following condition (13) is satisfied:

$$0.4<|D_{g3}/D|<1.0 \quad (13),$$

in which $D_{g3}$ is a displacement amount of the third lens unit from the wide-angle end to the telephoto end, which is represented by a positive sign when the third lens unit is positioned closer to the image side in the telephoto end than in the wide-angle end, and D is a sum of thicknesses along an optical axis from incidence surfaces to emission surfaces of the first lens unit, the second lens unit, the third lens unit and the fourth lens unit.

19. The zoom lens system according to claim 1, wherein the following condition (14) is satisfied:

$$-0.8<(r_{L2f}+r_{L2r})/(r_{L2f}-r_{L2r})<0.0 \quad (14),$$

in which $r_{L2f}$ is a paraxial radius of curvature of an object-side surface of the positive lens element of the first lens unit, and $r_{L2r}$ is a paraxial radius of curvature of an image-side surface of the positive lens element of the first lens unit.

20. The zoom lens system according to claim 1, wherein the following condition (15) is satisfied:

$$0.1<(r_{L3f}+r_{L3r})/(r_{L3f}-r_{L3r})<0.75 \quad (15),$$

in which $r_{L3f}$ is a paraxial radius of curvature of an object-side surface of the negative lens element of the second lens unit, and $r_{L3r}$ is a paraxial radius of curvature of an image-side surface of the negative lens element of the second lens unit.

21. The zoom lens system according to claim 1, wherein the positive lens element of the second lens unit is a positive meniscus lens whose convex surface faces the object side.

22. The zoom lens system according to claim 1, wherein the following condition (16) is satisfied:

$$-10<(r_{L4f}+r_{L4r})/(r_{L4f}-r_{L4r})<-2 \quad (16),$$

in which $r_{L4f}$ is a paraxial radius of curvature of an object-side surface of the positive lens element of the second lens unit, and $r_{L4r}$ is a paraxial radius of curvature of an image-side surface of the positive lens element of the second lens unit.

23. The zoom lens system according to claim 1, wherein the negative lens element of the third lens unit is a double concave lens.

24. The zoom lens system according to claim 23, wherein the following condition (17) is satisfied:

$$-0.8<(r_{L7f}+r_{L7r})/(r_{L7f}-r_{L7r})<0.8. \quad (17)$$

in which $r_{L7f}$ is a paraxial radius of curvature of an object-side surface of the double concave negative lens, and $r_{L7r}$ is a paraxial radius of curvature of an image-side surface of the double concave negative lens.

25. The zoom lens system according to claim 2, wherein the aperture stop moves integrally with the third lens unit.

26. The zoom lens system according to claim 1, wherein an object-side surface and an image-side surface of the negative lens element of the second lens unit are concave surfaces, each having negative power and each being aspherical surfaces, and wherein the refractive power of portions on the object-side and image-side surfaces weaken with distance from an optical axis.

27. The zoom lens system according to claim 1, wherein the positive lens element of the first lens unit is a double convex lens;

the negative lens element of the second lens unit is a double concave lens; and an image-side surface of the positive lens element of the first lens unit satisfies the following condition (18):

$$0.15<|r_{L2r}/f_{g1}|<2.00 \quad (18),$$

in which $r_{L2r}$ is a paraxial radius of curvature of the image-side surface of the positive lens element of the first lens unit, and $f_{g1}$ is a focal length of the first lens unit.

28. The zoom lens system according to claim 27, wherein the image-side surface of the positive lens element of the first lens unit is an aspherical surface which has a positive power and the refractive power of a portion on the surface weakens with distance from an optical axis.

29. The zoom lens system according to claim 1, wherein the following condition (19) is satisfied:

$$3.0<f_T/f_W \quad (19),$$

in which $f_T$ is a focal length of the zoom lens system in the telephoto end, and fW is a focal length of the zoom lens system in the wide-angle end.

30. A zoom lens system comprising, in order from an object side:

a first lens unit having a positive refractive power;
a second lens unit having a negative refractive power;
a third lens unit having a positive refractive power, and
a fourth lens unit having a positive refractive power,
wherein the first lens unit comprises a negative lens element and a positive lens element in order from the object side;
the second lens unit comprises a negative lens element and a positive lens element in order from the object side;
the third lens unit comprises a positive lens element, a positive lens element and a negative lens element in order from the object side;
the fourth lens unit comprises a positive lens element;
the total number of the lens elements of the first to fourth lens units is eight; and
during magnification change from a wide-angle end to a telephoto end,
an interval between the first lens unit and the second lens unit, an interval between the second lens unit and the third lens unit and an interval between the third lens unit and the fourth lens unit change,
the first lens unit moves, and
the second lens unit moves toward the object side, then a movement direction reverses, and the second lens unit moves toward an image side and is positioned closer to the image side in the telephoto end than in the wide-angle end.

31. A zoom lens system comprising, in order from an object side:
- a first lens unit having a positive refractive power;
- a second lens unit having a negative refractive power;
- a third lens unit having a positive refractive power; and
- a fourth lens unit having a positive refractive power;
- wherein the first lens unit comprises a negative lens element and a positive lens element in order from the object side;
- the second lens unit comprises a negative lens element and a positive lens element in order from the object side;
- the third lens unit comprises a positive lens element, a positive lens element and a negative lens element in order from the object side;
- the fourth lens unit comprises a positive lens element;
- the total number of the lens elements of the first to fourth lens units is eight;
- during magnification change from a wide-angle end to a telephoto end,
    - an interval between the first lens unit and the second lens unit, an interval between the second lens unit and the third lens unit and an interval between the third lens unit and the fourth lens unit change, and
    - the first lens unit moves;
- and wherein the following condition (14) is satisfied:

$$-0.8 < (r_{L2f} + r_{L2r})/(r_{L2f} - r_{L2r}) < 0.0 \quad (14),$$

in which $r_{L2f}$ is a paraxial radius of curvature of an object-side surface of the positive lens element of the first lens unit, and $r_{L2r}$ is a paraxial radius of curvature of an image-side surface of the positive lens element of the first lens unit.

32. A zoom lens system comprising, in order from an object side:
- a first lens unit having a positive refractive power;
- a second lens unit having a negative refractive power;
- a third lens unit having a positive refractive power; and
- a fourth lens unit having a positive refractive power;
- wherein the first lens unit comprises a negative lens element and a positive lens element in order from the object side;
- the second lens unit comprises a negative lens element and a positive lens element in order from the object side;
- the third lens unit comprises a positive lens element, a positive lens element and a negative lens element in order from the object side;
- the fourth lens unit comprises a positive lens element;
- the total number of the lens elements of the first to fourth lens units is eight; and
- during magnification change from a wide-angle end to a telephoto end,
    - an interval between the first lens unit and the second lens unit, an interval between the second lens unit and the third lens unit and an interval between the third lens unit and the fourth lens unit change, and
    - the first lens unit moves;
- and wherein the following condition (15) is satisfied:

$$0.1 < (r_{L3f} + r_{L3r})/(r_{L3f} - r_{L3r}) < 0.75 \quad (15),$$

in which $r_{L3f}$ is a paraxial radius of curvature of an object-side surface of the negative lens element of the second lens unit, and $r_{L3r}$ is a paraxial radius of curvature of an image-side surface of the negative lens element of the second lens unit.

33. A zoom lens system comprising, in order from an object side:
- a first lens unit having a positive refractive power;
- a second lens unit having a negative refractive power;
- a third lens unit having a positive refractive power; and
- a fourth lens unit having a positive refractive power;
- wherein the first lens unit comprises a negative lens element and a positive lens element in order from the object side;
- the second lens unit comprises a negative lens element and a positive lens element in order from the object side;
- the third lens unit comprises a positive lens element, a positive lens element and a negative lens element in order from the object side;
- the fourth lens unit comprises a positive lens element;
- the total number of the lens elements of the first to fourth lens units is eight; and
- during magnification change from a wide-angle end to a telephoto end,
    - an interval between the first lens unit and the second lens unit, an interval between the second lens unit and the third lens unit and an interval, between the third lens unit and the fourth lens unit change, and
    - the first lens unit moves;
- the positive lens element of the first lens unit is a double convex lens;
- the negative lens element of the second lens unit is a double concave lens; and
- an image-side surface of the positive lens element of the first lens unit satisfies the following condition (18):

$$0.15 < |r_{L2r}/f_{g1}| < 2.00 \quad (18)$$

in which $r_{rL2r}$ is a paraxial radius of curvature of the image-side surface of the positive lens element of the first lens unit, and $f_{g1}$ is a focal length of the first lens unit.

34. The zoom lens system according to claim 33, wherein the image-side surface of the positive lens element of the first lens unit is an aspherical surface which has a positive power and the refractive power of a portion on the surface weakens with distance from an optical axis.

35. A zoom lens system comprising, in order from an object side:
- a first lens unit having a positive refractive power;
- a second lens unit having a negative refractive power;
- an aperture stop;
- a third lens unit having a positive refractive power; and
- a fourth lens unit having a positive refractive power,
- wherein the first lens unit comprises a negative lens element and a positive lens element in order from the object side;
- the second lens unit comprises a negative lens element and a positive lens element in order from the object side;
- the third lens unit comprises two positive lens elements convex to the object side and a negative lens element concave to an image side;
- the fourth lens unit comprises a positive lens element;
- the total number of the lens elements of the first to fourth lens units is eight; and
- during magnification change from a wide-angle end to a telephoto end,
    - an interval between the first lens unit and the second lens unit, an interval between the second lens unit and the third lens unit and an interval between the third lens unit and the fourth lens unit change, and each of the first lens unit, the second lens unit and the third lens unit is moved;

the negative lens element of the second lens unit is double concave lens having a plurality of aspherical surfaces, the positive lens element of the second lens unit is meniscus lens convex to the object side, the negative lens element of the third lens unit is cemented with an image side surface of at least one of the two positive lens elements of the third lens unit, an object side surface of a positive lens element which is disposed in the object side among the two positive lens elements of the third lens unit is an aspherical surface, and the aperture stop moves in an optical axis direction integrally with the third lens unit during the magnification change.

36. The zoom lens system according to claim 35, wherein during the magnification change from the wide-angle end to the telephoto end, the second lens group performs the movement that a movement direction is reversed.

* * * * *